(12) United States Patent
Fukuda

(10) Patent No.: US 8,402,355 B2
(45) Date of Patent: Mar. 19, 2013

(54) SIGNAL PROCESSING DEVICE AND ERROR CORRECTION METHOD

(75) Inventor: Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 423 days.

(21) Appl. No.: 12/768,153

(22) Filed: Apr. 27, 2010

(65) Prior Publication Data

US 2010/0287434 A1 Nov. 11, 2010

(30) Foreign Application Priority Data

May 8, 2009 (JP) .................................. 2009-113892

(51) Int. Cl.
*G06F 11/00* (2006.01)
(52) U.S. Cl. ........................................ 714/811; 375/286
(58) Field of Classification Search .................. 714/752, 714/811; 375/286, 289, 359
See application file for complete search history.

(56) References Cited

U.S. PATENT DOCUMENTS

| 3,439,330 A | 4/1969 | Sipress et al. |
| 5,946,355 A * | 8/1999 | Baker ............................ 375/286 |
| 7,995,693 B2 * | 8/2011 | Lee ................................. 375/359 |
| 2003/0194017 A1 | 10/2003 | Woodworth |

FOREIGN PATENT DOCUMENTS

| EP | 0 411 526 A1 | 2/1991 |
| JP | 3-109843 | 5/1991 |

* cited by examiner

*Primary Examiner* — Philip Guyton
(74) *Attorney, Agent, or Firm* — Oblon, Spivak, McClelland, Maier & Neustadt, L.L.P.

(57) ABSTRACT

Provided is a signal processing device including a signal receiving unit for receiving a multilevel signal having a signal waveform that is obtained by synchronously adding an encoded signal generated based on a specific coding rule and a clock which has an amplitude larger than the encoded signal and for which the transmission speed is half that of the encoded signal, an amplitude level detection unit for detecting an amplitude level of the multilevel signal received by the signal receiving unit, a violation detection unit for detecting a bit position at which rule violation of the specific coding rule occurred, based on a change pattern of the amplitude level detected by the amplitude level detection unit, and an error correction unit for correcting a detection value of the amplitude level corresponding to the bit position detected by the violation detection unit so that the rule violation is resolved.

7 Claims, 13 Drawing Sheets

EYE PATTERN

| AMI DATA | CLOCK | FINAL CODE |
|---|---|---|
| 1 | 2 | 3 |
|   | -2 | -1 |
| 0 | 2 | 2 |
|   | -2 | -2 |
| -1 | 2 | 1 |
|   | -2 | -3 |

IMPOSSIBLE CHANGE (between 3 and -1)

IMPOSSIBLE CHANGE (between 1 and -3)

CODING RULE FOR 6-LEVEL CODE

EYE PATTERN

FRAME STRUCTURE

FIG. 13

| BEFORE CORRECTION | AFTER CORRECTION |
|---|---|
| LEVEL: 3, -1 → | LEVEL IS PRESUMED TO BE (2,-1) → DATA IS DETERMINED TO BE (0,1) |
| LEVEL: -1, 3 → | LEVEL IS PRESUMED TO BE (-1,2) → DATA IS DETERMINED TO BE (1,0) |
| LEVEL: 1, -3 → | LEVEL IS PRESUMED TO BE (1,-2) → DATA IS DETERMINED TO BE (1,0) |
| LEVEL: -3, 1 → | LEVEL IS PRESUMED TO BE (-2,1) → DATA IS DETERMINED TO BE (0,1) |

| BEFORE CORRECTION | AFTER CORRECTION |
|---|---|
| LEVEL: 3, -1 → | LEVEL IS PRESUMED TO BE (2,-1) → DATA IS DETERMINED TO BE (0,1) |
| LEVEL: -1, 3 → | LEVEL IS PRESUMED TO BE (-1,2) → DATA IS DETERMINED TO BE (1,0) |
| LEVEL: 1, -3 → | LEVEL IS PRESUMED TO BE (1,-2) → DATA IS DETERMINED TO BE (1,0) |
| LEVEL: -3, 1 → | LEVEL IS PRESUMED TO BE (-2,1) → DATA IS DETERMINED TO BE (0,1) |

(#2)

| BEFORE CORRECTION | AFTER CORRECTION |
|---|---|
| LEVEL: 3, -1 → | LEVEL IS PRESUMED TO BE (3,-2) → DATA IS DETERMINED TO BE (1,0) |
| LEVEL: -1, 3 → | LEVEL IS PRESUMED TO BE (-2,3) → DATA IS DETERMINED TO BE (0,1) |
| LEVEL: 1, -3 → | LEVEL IS PRESUMED TO BE (2,-3) → DATA IS DETERMINED TO BE (0,1) |
| LEVEL: -3, 1 → | LEVEL IS PRESUMED TO BE (-3,2) → DATA IS DETERMINED TO BE (1,0) |

SIGNAL PROCESSING DEVICE AND ERROR CORRECTION METHOD

BACKGROUND OF THE INVENTION

1. Field of the Invention

The present invention relates to a signal processing device, and an error correction method.

2. Description of the Related Art

Most information processing apparatuses such as mobile phone and notebook personal computer (hereinafter, a notebook PC) use a movable member for a hinge portion connecting a main body to be operated by a user and a display portion on which information is displayed. However, a large number of signal lines and power lines pass through the hinge portion, and a method for maintaining reliability of the wiring is desired. Reducing the number of the signal lines passing through the hinge portion comes first to mind. Therefore, data transmission processing between the main body and the display portion is made to be performed by using a serial transmission method instead of a parallel transmission method. When the serial transmission method is used, the number of signal lines is decreased, and furthermore, an effect that the electromagnetic interference (EMI) is decreased can be also obtained.

In the serial transmission method, data is encoded and then transmitted. At that time, for example, a Non Return to Zero (NRZ) encoding scheme, a Manchester encoding scheme, an Alternate Mark Inversion (AMI) encoding scheme, or the like is used as the encoding scheme. For example, JP-A-1991-109843 discloses a technology for transmitting data by using an AMI code, which is a representative example of a bipolar code. The patent document also discloses a technology according to which a data clock is transmitted after being expressed by an intermediate value of a signal level, and the receiving side regenerates the data clock based on the signal level.

SUMMARY OF THE INVENTION

However, in an information processing apparatus such as a notebook PC, even if the serial transmission method using the above code is used, the number of signal lines wired in the hinge portion is still large. For example, in a case of a notebook PC, there are wiring lines related to an LED backlight for illuminating an LCD in addition to video signals to be transmitted to the display portion, and thus several tens of signal lines including these signal lines are wired in the hinge portion. The LCD is an abbreviation for Liquid Crystal Display, and the LED is an abbreviation for Light Emitting Diode.

Therefore, the inventor of the present invention has developed an encoding scheme (hereinafter, new scheme) according to which a DC component is not included and according to which a clock component can be easily extracted from a received signal. Since a transmission signal generated based on this new scheme does not include a DC component, it can be transmitted by being superimposed on DC power. Furthermore, by detecting the polarity inversion cycle of the transmission signal, a clock can be regenerated by the receiving side without using a PLL. Therefore, a plurality of signal lines can be bound together, and thereby the number of signal lines can be reduced and also the power consumption and circuit scale can be reduced. The PLL is an abbreviation for Phase Locked Loop.

However, the transmission signal generated based on the above-described new scheme is a multilevel signal expressing one bit value in a plurality of amplitude levels. Thus, a SN ratio has to be about 10 dB higher than that of a generally used 2-level signal expressing one bit value in one amplitude level. The above-described new scheme is developed to be used for a transmission signal within a device. Thus, a transmission line to which the above-described new scheme is to be applied is significantly higher in transmission quality compared to a radio channel. However, since the transmission signal will have multiple levels, a transmission error may occur under the influence of unexpected external noise, noise occurring within the device, and the like.

To improve the transmission quality of the transmission line, transmission data can be transmitted with an error correction code such as a convolutional code added thereto, and the receiving side can perform the error correction. However, as described above, the new scheme assumes a transmission line with relatively high transmission quality. Therefore, it would be excessive to perform a high-level error correction using a convolutional code or the like on a minor transmission error occurring in such transmission line, and also, it is undesirable from the standpoint of the power consumption and circuit scale.

In light of the foregoing, it is desirable to provide a signal processing device and an error correction method which are novel and improved, and which are capable of improving transmission quality in an environment where the transmission quality is relatively high without adding a special error correction code to transmission data.

According to an embodiment of the present invention, there is provided a signal processing device which includes a signal receiving unit for receiving a multilevel signal having a signal waveform that is obtained by synchronously adding an encoded signal generated based on a specific coding rule and a clock which has an amplitude larger than the encoded signal and for which the transmission speed is half that of the encoded signal, an amplitude level detection unit for detecting an amplitude level of the multilevel signal received by the signal receiving unit, a violation detection unit for detecting a bit position at which rule violation of the specific coding rule occurred, based on a change pattern of the amplitude level detected by the amplitude level detection unit, and an error correction unit for correcting a detection value of the amplitude level corresponding to the bit position detected by the violation detection unit so that the rule violation is resolved.

Furthermore, the error correction unit may be configured to correct the detection value of the amplitude level corresponding to the bit position detected by the violation detection unit to an amplitude level adjacent to the detection value so that the rule violation is resolved.

Furthermore, the multilevel signal may have a signal waveform that is obtained by synchronously adding an encoded signal generated based on a specific bipolar coding rule and the clock.

Furthermore, the signal receiving unit may be configured to receive a multilevel signal having a signal waveform which has six amplitude levels (A3, A2, A1, −A1, −A2, −A3; |A3|>|A2|>|A1|) and which is obtained by synchronously adding an encoded signal generated based on an AMI coding rule and the clock. In this case, the violation detection unit recognizes a change pattern of amplitude levels of consecutive two bits changing from A3 to −A1 or from A1 to −A3 among amplitude levels detected by the amplitude level detection unit from the multilevel signal received by the signal receiving unit, and detects the recognized bit position as a bit position at which the rule violation occurred.

Furthermore, the error correction unit may be configured to correct, in case a change pattern of changing from A3 to −A1 is recognized by the violation detection unit, the detection value A3 of the amplitude level corresponding to the recognized bit position to A2 or corrects the detection value −A1 of the amplitude level to −A2. In this case, in case a change pattern of changing from A1 to −A3 is recognized by the violation detection unit, the detection value A1 of the amplitude level corresponding to the recognized bit position is corrected to A2 or the detection value −A3 of the amplitude level is corrected to −A2.

Furthermore, the signal processing device may further include a decoding unit for decoding a bit sequence based on an amplitude level which has been corrected by the error correction unit, and an error detection unit for performing error detection by using the bit sequence that has been decoded by the decoding unit. In this case, in case a plurality of correction candidates exist for the detection value of the amplitude level at the error correction unit, a bit sequence is decoded for each correction candidate by the decoding unit, and a correct bit sequence is output by performing error detection by the error detection unit for each decoding result.

According to another embodiment of the present invention, there is provided an error correction method which includes the steps of receiving a multilevel signal having a signal waveform that is obtained by synchronously adding an encoded signal generated based on a specific coding rule and a clock which has an amplitude larger than the encoded signal and for which the transmission speed is half that of the encoded signal, detecting an amplitude level of the multilevel signal received in the step of receiving a signal, detecting a bit position at which rule violation of the specific coding rule occurred, based on a change pattern of the amplitude level detected in the step of detecting an amplitude level, and correcting a detection value of the amplitude level corresponding to the bit position detected in the step of detecting a violation so that the rule violation is resolved.

According to the embodiments of the present invention described above, transmission quality can be improved in an environment where the transmission quality is relatively high without adding a special error correction code to transmission data.

BRIEF DESCRIPTION OF THE DRAWINGS

FIG. 13 is an explanatory diagram showing an example of an error correction method according to the present embodiment;

FIG. 15 is an explanatory diagram showing an example of an error correction method according to a modified example of the present embodiment.

DETAILED DESCRIPTION OF THE EMBODIMENT(S)

Figure 1:
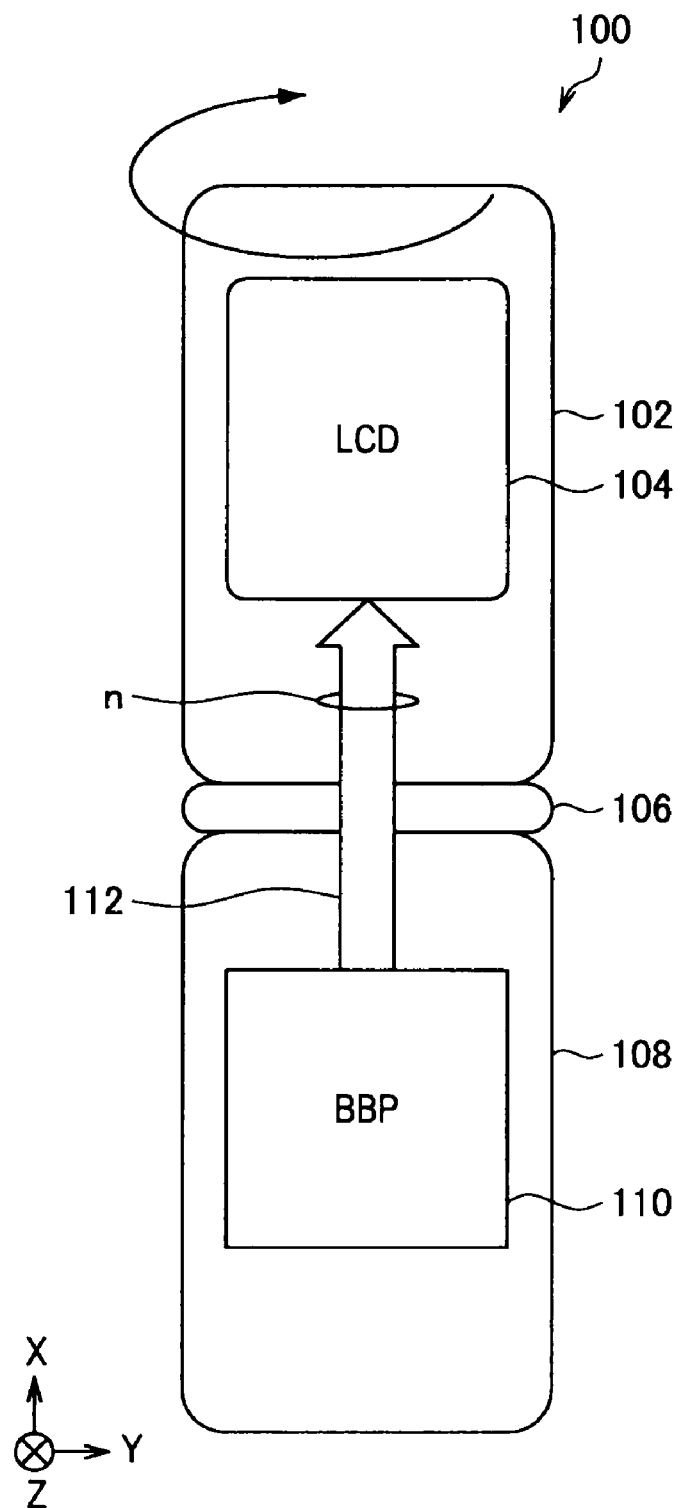
FIG. 1 is an explanatory diagram showing a configuration example of a mobile terminal adopting a parallel transmission scheme.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Description>

The flow of a description of an embodiment of the present invention described below will be briefly mentioned. First, a device configuration of a mobile terminal 100 adopting a parallel transmission scheme will be described with reference to FIG. 1. Herein, a demerit relating to the parallel transmission scheme will be pointed out. Then, a device configuration of a mobile terminal 130 adopting a serial transmission scheme will be described with reference to FIG. 2. Then, a functional configuration of a general mobile terminal 130 will be described with reference to FIG. 3. Herein, a brief description of an AMI code will be made with reference to FIG. 4. The AMI is an abbreviation for Alternate Mark Inversion.

Next, a functional configuration of a mobile terminal 130 adopting an encoding method according to the above-described new scheme will be described with reference to FIG. 5. Then, an encoding method according to the above-described new scheme will be described with reference to FIG. 6. Then, a relationship between an amplitude level of a line code generated based on the above-described new scheme and an AMI coding rule will be described with reference to FIGS. 7 and 8. Then, with reference to FIGS. 8 to 11, a transmission error occurring in a transmission line in case of transmitting the line code according to the new scheme will be described at the same time as describing a detection method for the transmission error.

Next, a functional configuration of a mobile terminal 200 according to an embodiment of the present invention will be described with reference to FIG. 12. Herein, an error correction method according to the embodiment will be described with reference to FIG. 13. Then, a functional configuration of a mobile terminal 200 according to a modified example of the embodiment will be described with reference to FIG. 14. Herein, an error correction method according to the modified example of the embodiment will be described with reference to FIG. 15. Lastly, the technical idea of the embodiment will be summarized and operational effects obtained by the technical idea will be briefly described.

(Description Items)
1: Introduction
1-1: Configuration of Mobile Terminal 100 Adopting Parallel Transmission Scheme
1-2: Configuration of Mobile Terminal 130 Adopting Serial Transmission Scheme
1-3: Functional Configuration of Mobile Terminal 130 according to New Scheme
2: Embodiment
2-1: AMI Coding Rule and Amplitude Pattern of Multilevel Code
2-2: Error Detection Method
2-3: Functional Configuration of Mobile Terminal 200
2-4: Error Correction Method
3: Modified Example
3-1: Functional Configuration of Mobile Terminal 200
4: Conclusion 1: Introduction First, before describing in detail the technology according to an embodiment of the present invention, issues to be solved by the present embodiment will be briefly summarized.

(1-1: Configuration of Mobile Terminal 100 Adopting Parallel Transmission Scheme)

First, a device configuration of a mobile terminal 100 adopting a parallel transmission scheme will be briefly described with reference to FIG. 1. FIG. 1 is an explanatory diagram showing an example of the device configuration of the mobile terminal 100 adopting a parallel transmission scheme. In FIG. 1, a mobile phone is schematically illustrated as an example of the mobile terminal 100. However, the application scope of the technology described below is not limited to a mobile phone. For example, it can be applied to an information processing apparatus such as a notebook PC or various portable electronic devices.

As shown in FIG. 1, the mobile terminal 100 mainly includes a display unit 102, a liquid crystal unit 104 (LCD), a connecting unit 106, an operation unit 108, a baseband processor 110 (BBP), and a parallel signal path 112. The LCD is an abbreviation for Liquid Crystal Display. Additionally, the display unit 102 and the operation unit 108 may be respectively referred to as a display side and a main body side. Additionally, for the sake of explanation, a case where an image signal is transmitted through the parallel signal path 112 will be described as an example. Of course, the type of a signal to be transmitted through the parallel signal path 112 is not limited to such, and it may also be a control signal, an audio signal, or the like, for example.

As shown in FIG. 1, the liquid crystal unit 104 is provided on the display unit 102. The image signal transmitted through the parallel signal path 112 is input to the liquid crystal unit 104. The liquid crystal unit 104 displays an image based on the input image signal. Also, the connecting unit 106 is a member connecting the display unit 102 and the operation unit 108. The connecting member forming the connecting unit 106 has a structure that enables the display unit 102 to rotate 180 degrees in a Z-Y plane, for example. The connecting member can also be formed such that the display unit 102 can rotate in an X-Z plane. In this case, the mobile terminal 100 will have a structure capable of folding. Additionally, the connecting member may also have a structure that allows the display unit 102 to move freely in any direction.

The baseband processor 110 is a computational processing unit that provides the mobile terminal 100 with a communication control function and an application execution function.

A parallel signal that is output from the baseband processor 110 is transmitted through the parallel signal path 112 to the liquid crystal unit 104 of the display unit 102. The parallel signal path 112 is provided with a plurality of signal lines. In the case of a mobile phone, for example, the number n of the signal lines is approximately fifty lines. The image signal transmission speed is approximately 130 Mbps in a case where the resolution of the liquid crystal unit 104 is QVGA. The parallel signal path 112 is wired such that the lines pass through the connecting unit 106.

In other words, the plurality of signal lines that form the parallel signal path 112 are provided in the connecting unit 106. As described above, if the range of movement of the connecting unit 106 is increased, the risk increases that the movement will inflict damage on the parallel signal path 112. This would result in impairment of the reliability of the parallel signal path 112. On the other hand, if the reliability of the parallel signal path 112 is maintained, the range of movement of the connecting unit 106 will be restricted. It is for this reason that the serial transmission scheme has come to be widely used in mobile phones and the like in order to maintain the reliability of the parallel signal path 112 while also increasing the degree of freedom of the movable member that forms the connecting unit 106. The shift to the serial transmission scheme for the transmission line is also being promoted from the standpoint of electromagnetic interference (EMI).

(1-2: Configuration of Mobile Terminal 130 Adopting Serial Transmission Scheme)

Figure 2:
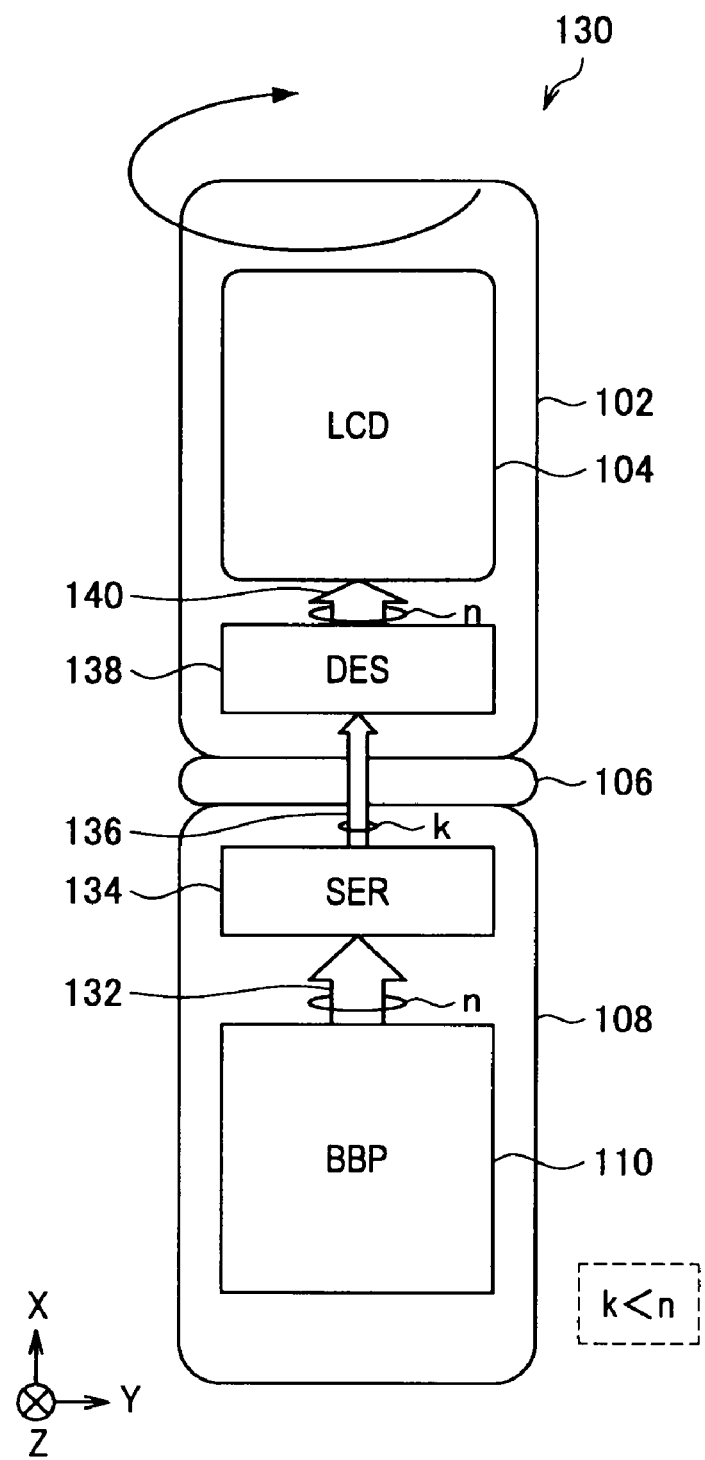
FIG. 2 is an explanatory diagram showing a configuration example of a mobile terminal adopting a serial transmission scheme.

Now, a device configuration of a mobile terminal 130 adopting the serial transmission scheme will be briefly described with reference to FIG. 2. FIG. 2 is an explanatory diagram showing an example of the device configuration of the mobile terminal 130 adopting the serial transmission scheme. In FIG. 2, a mobile phone is schematically illustrated as an example of the mobile terminal 130. However, the application scope of the technology described below is not limited to a mobile phone. For example, it can be applied to an information processing apparatus such as a notebook PC or various portable electronic devices. Furthermore, structural elements having functions substantially the same as those of the mobile terminal 100 of the parallel transmission scheme shown in FIG. 1 will be denoted with the same reference numerals, and detailed explanation of these structural elements will be omitted.

As shown in FIG. 2, the mobile terminal 130 mainly includes the display unit 102, the liquid crystal unit 104 (LCD), the connecting unit 106, and the operation unit 108. Also, the mobile terminal 130 includes the baseband processor 110 (BBP), parallel signal paths 132, 140, a serializer 134, a serial signal path 136, and a deserializer 138.

Unlike the mobile terminal 100 that is described above, the mobile terminal 130 transmits the image signal by the serial transmission scheme through the serial signal path 136 that is wired through the connecting unit 106. Therefore, the serializer 134 is provided in the operation unit 108 to serialize the parallel signal that is output from the baseband processor 110. On the other hand, the deserializer 138 is provided in the display unit 102 to parallelize the serial signal that is transmitted through the serial signal path 136.

The serializer 134 converts the parallel signal that is output from the baseband processor 110 and input through the parallel signal path 132 into a serial signal. The serial signal that has been converted by the serializer 134 is input to the deserializer 138 through the serial signal path 136. When the serial signal is input, the deserializer 138 restores the original parallel signal from the input serial signal. Then, the deserializer 138 inputs the parallel signal to the liquid crystal unit 104 through the parallel signal path 140.

In the serial signal path 136, a data signal that is encoded by the NRZ encoding scheme, for example, may be transmitted on its own, or alternatively, the data signal and a clock signal may be transmitted together. The number k of the lines in the serial signal path 136 is significantly less than the number n of the lines in the parallel signal path 112 in the mobile terminal 100 in FIG. 1 ($1 \leq k \ll n$). For example, the number k of the lines can be reduced to only a few lines. Therefore, the degree of freedom relating to the movable range of the connecting unit 106 through which the serial signal path 136 passes can be said to be very much greater than that of the connecting unit 106 through which the parallel signal path 112 passes. At the same time, it can also be said that the reliability of the serial signal path 136 is high. Additionally, a differential signal such as a LVDS or the like is ordinarily used for the serial signal that flows through the serial signal path 136. The LVDS is an abbreviation for Low Voltage Differential Signal.

Heretofore, the device configuration of the mobile terminal 130 has been briefly described. The overall device configuration of the mobile terminal 130 adopting the serial transmission scheme is approximately as described above. However, how much the number of signal lines in the connecting unit 106 can be reduced depends on the form of the signal flowing through the serial signal path 136. The serializer 134 and the deserializer 138 are to determine the form of this signal. In the following, functional configurations of the serializer 134 and the deserializer 138 in a general serial transmission scheme will be briefly described. Afterwards, functional configurations of the serializer 134 and the deserializer 138 according to the above-described new scheme will be described.

(General Configuration)

Figure 3:
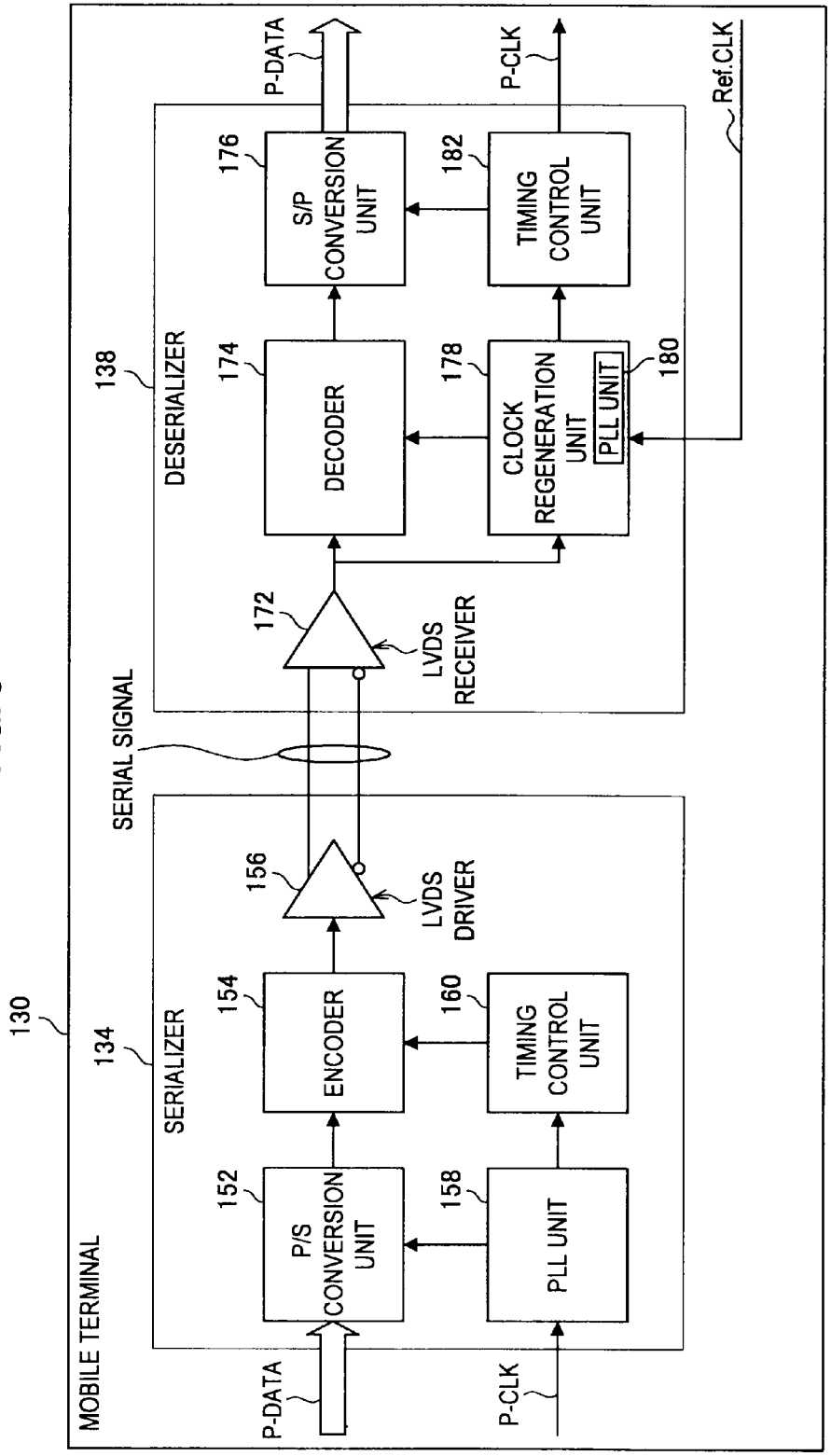
FIG. 3 is an explanatory diagram showing a functional configuration example of a mobile terminal adopting a general serial transmission scheme.

Here, a functional configuration of the mobile terminal 130 adopting a general serial transmission scheme will be described with reference to FIG. 3. FIG. 3 is an explanatory diagram showing a functional configuration example of the mobile terminal 130 adopting a general serial transmission scheme. However, it should be noted that FIG. 3 is an explanatory diagram mainly illustrating the functional configurations of the serializer 134 and the deserializer 138, and that description of other structural elements are omitted.

(Serializer 134)

As shown in FIG. 3, the serializer 134 includes a P/S conversion unit 152, an encoder 154, an LVDS driver 156, a PLL unit 158, and a timing control unit 160.

As shown in FIG. 3, the parallel signal (P-DATA) and a parallel signal clock (P-CLK) are input from the baseband processor 110 to the serializer 134. The parallel signal that is input to the serializer 134 is converted into a serial signal by the P/S conversion unit 152. The serial signal that has been converted by the P/S conversion unit 152 is input to the encoder 154. The encoder 154 adds a header and the like to the serial signal and inputs it to the LVDS driver 156. The LVDS driver 156 transmits the input serial signal to the deserializer 138 by a differential transmission scheme according to LVDS.

In contrast, the parallel signal clock that is input to the serializer 134 is input to the PLL unit 158. The PLL unit 158 generates a serial signal clock from the parallel signal clock and inputs it to the P/S conversion unit 152 and to the timing control unit 160. The timing control unit 160 controls the timing of the transmission of the serial signal by the encoder 154, based on the serial signal clock that is input.

(Deserializer 138)

Furthermore, as shown in FIG. 3, the deserializer 138 mainly includes an LVDS receiver 172, a decoder 174, an S/P conversion unit 176, a clock regeneration unit 178, a PLL unit 180, and a timing control unit 182.

As shown in FIG. 3, the serial signal is transmitted to the deserializer 138 from the serializer 134 by the differential transmission scheme according to LVDS. The serial signal is received by the LVDS receiver 172. The serial signal that is received by the LVDS receiver 172 is input to the decoder 174 and to the clock regeneration unit 178. The decoder 174 detects the beginning portion of the data by referring to the header of the input serial signal and inputs the signal to the S/P conversion unit 176. The S/P conversion unit 176 converts the input serial signal into the parallel signal (P-DATA). The parallel signal that has been converted by the S/P conversion unit 176 is output to the liquid crystal unit 104.

For its part, the clock regeneration unit 178 uses the built-in PLL unit 180 to regenerate the parallel signal clock from the serial signal clock by referring to a reference clock (Ref-.CLK) that is input from the outside. The parallel signal clock that has been regenerated by the clock regeneration unit 178 is input to the decoder 174 and to the timing control unit 182. The timing control unit 182 controls the receiving timing based on the parallel signal clock that is input from the clock regeneration unit 178. The parallel signal clock (P-CLK) that is input to the timing control unit 182 is output to the liquid crystal unit 104.

In this manner, the parallel signal (P-DATA) and the parallel signal clock (P-CLK) that are input to the serializer 134 from the baseband processor 110 are converted into the serial signals and are transmitted to the deserializer 138. The input serial signals are then restored by the deserializer 138 to the original parallel signal and parallel signal clock. The parallel signal and the parallel signal clock that have been restored are input to the liquid crystal unit 104. In case the parallel signal is an image signal, an image is displayed by the liquid crystal unit 104 based on the input parallel signal.

Heretofore, a general functional configuration of the mobile terminal 130 adopting the serial transmission scheme has been described. As described above, the transmission line is serialized by converting the parallel signal into the serial signal and transmitting the serial signal. The range of movement of the portion through which the serial signal path passes is enlarged as a result, and the degree of freedom in the disposition of the display unit 102 is increased. Therefore, in a case where the mobile terminal 130 is used to watch and listen to a television broadcast or the like, for example, it is possible to transform the mobile terminal 130 such that the display unit 102 is disposed in a landscape orientation from the user's point of view. The increase in the degree of freedom brings with it a wider range of uses for the mobile terminal 130, such that, in the addition of various types of communication terminal functions, a wide variety of uses becomes possible, such as watching videos, listening to music, and the like.

Additionally, the above example describes a method of serializing a data signal such as an image signal and transmitting the same. In addition to the transmission line for the data signal, at least a power line is provided in the connecting unit 106 of the mobile terminal 130. Break in the power line will cause a serious damage, and thus, it is extremely important to improve its reliability. Also, the restriction imposed on the range of movement of the connecting unit 106 greatly differs for a case where the number of the transmission lines is 1 and for a case where it is 2 or more. Thus, a scheme has been devised according to which the data signal is transmitted being superimposed on a power signal.

This scheme is for encoding the data signal into a code form that does not include a DC component, such as an AMI code (see FIG. 4) and a Manchester code, and transmitting the data signal by superimposing the same on a power signal. Using this method will enable to reduce the number of the transmission lines in the connecting unit 106 by the number of the power lines.

(Summary of Issues 1)

As explained above, a parallel transmission scheme like that of the mobile terminal 100 that is described above is not well suited to freely change the positional relationship of the operation unit 108 and the display unit 102. Accordingly, a method has been proposed to provide the serializer 134 and the deserializer 138, as in the mobile terminal 130 that is described above, to make serial transmission possible and increase the range of movement of the display unit 102. Also, to further improve the movability of the display unit 102, a scheme has been proposed to superimpose a signal on the power line and transmit the signal, by taking the advantage of the characteristics of a code not including a DC component.

However, as shown in FIG. 3, the PLL unit 180 (hereinafter, PLL) is used in the mobile terminal 130 to regenerate the clock of a received serial signal. This PLL is necessary to extract a clock from a signal which is encoded according to the Manchester encoding scheme or the like. However, the amount of power consumption of the PLL itself is not small. Thus, providing the PLL will increase the power consumption of the mobile terminal 130 by the amount of the power consumption by the PLL. Such increase in the amount of the power consumption will be a grave issue for a small device such as a mobile phone and the like.

In view of such issue, the inventor of the present invention has devised a novel transmission scheme (new scheme) of transmitting a signal which does not include a DC component and which is transmitted by using a code for which a PLL circuit is not necessary at the time of clock regeneration, so that a PLL will not be necessary at the deserializer 138. Hereunder, this new scheme will be described. Additionally, although, in the following explanation, an encoding method according to the new scheme for which the AMI code serves as a base will be taken as the concrete example, the application target of the new scheme is not limited to the AMI code.

(1-3: Functional Configuration of Mobile Terminal 130 according to New Scheme)

First, the AMI code will be briefly described, and then, the functional configuration of the mobile terminal 130 according to the new scheme and the encoding method of such mobile terminal 130 will be described.

(Signal Waveform of AMI Code)

Figure 4:
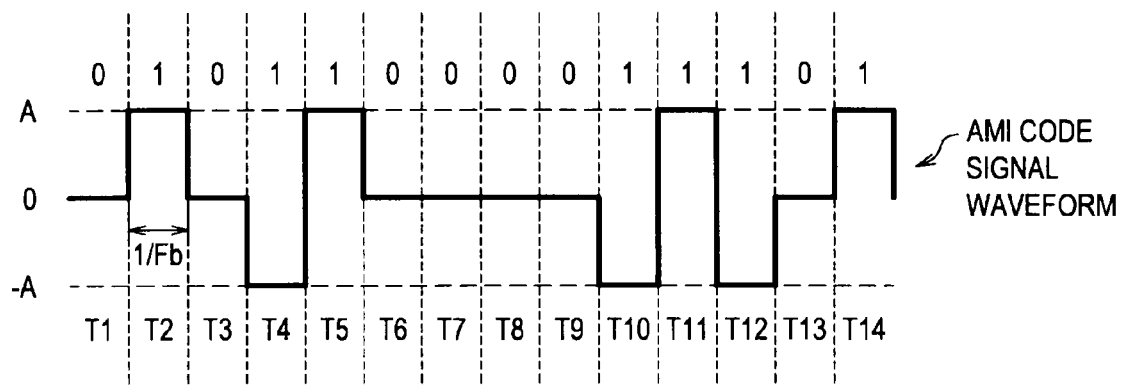
FIG. 4 is an explanatory diagram showing a signal waveform of an AMI code.

First, the signal waveform of the AMI code and its characteristics will be briefly described with reference to FIG. 4. FIG. 4 is an explanatory diagram showing an example of the signal waveform of the AMI code. In the following explanation, it is assumed that A is any positive number.

The AMI code is a code that uses an electrical potential of zero to express a data value of zero and potentials of A and −A to express a data value of 1. Note, however, that the potential A and the potential −A are used alternately. That is, after a data value of 1 has been expressed by the potential A, if the next data bit is also a 1, that 1 will be expressed by the potential −A. Because the data values are expressed by repeatedly inverting the polarity in this manner, the AMI code does not contain a DC component.

Other codes with the same type of characteristics as the AMI code include, for example, the partial response scheme that expresses the data as PR (1, −1), PR (1, 0, −1), PR (1, 0, . . . , −1), and the like. Transmission codes that use this sort of polarity inversion are called bipolar codes. Alternatively, a dicoding scheme or the like can also be used for the encoding method of the new scheme. In the following explanation, an encoding method which uses an AMI code with a duty of 100% will be described as an example.

FIG. 4 schematically shows the AMI code of periods T1 to T14. In the drawing, a data value 1 appears at timings T2, T4, T5, T10, T11, T12, and T14. If the potential is A at timing T2, the potential at timing T4 is −A. Also, the potential at timing T5 is A. As such, the amplitude corresponding to the data value 1 is alternately inverted between positive and negative values. This is the polarity inversion that is described above.

In contrast, a data value 0 is expressed by a potential 0 at all times. This form of expression allows the AMI code to not include a DC component. However, as can be seen at timings T6 to T9, it sometimes results in consecutive potentials of 0. The consecutive potentials of 0 make it difficult to extract the clock component from the signal waveform without using a PLL. Accordingly, the inventor of the present invention has devised, as the new scheme, a method of superimposing a clock on the AMI code (or a code having equivalent characteristics) before transmitting the same. This method will be described later in detail.

(Functional Configuration of Mobile Terminal 130)

Hereunder, the functional configuration of the mobile terminal 130 according to the new scheme will be described with reference to FIG. 5. FIG. 5 is an explanatory diagram showing an example of the functional configuration of the mobile terminal 130 according to the new scheme. However, it should be noted that FIG. 5 is an explanatory diagram mainly illustrating the functional configurations of the serializer 134 and the deserializer 138, and that description of other structural elements are omitted. Also, detailed description of the structural elements of the mobile terminal 130 already described are omitted.

(Serializer 134)

First, the serializer 134 will be described. As shown in FIG. 5, the serializer 134 is configured from the P/S conversion unit 152, the LVDS driver 156, the PLL unit 158, the timing control unit 160, and an encoder 192. The main point of difference from the general configuration described earlier is in the function of the encoder 192.

Figure 5:
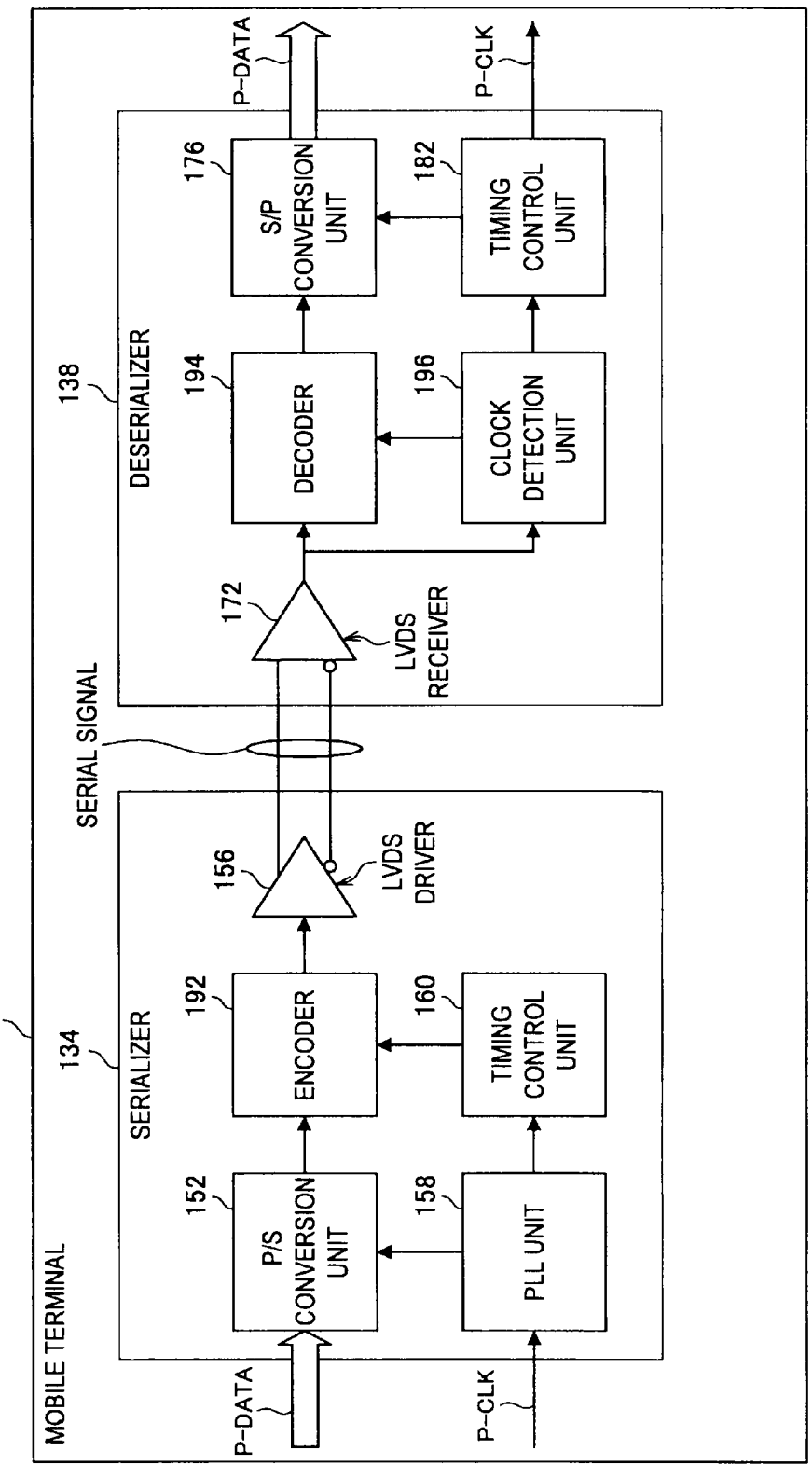
FIG. 5 is an explanatory diagram showing a functional configuration example of a mobile terminal according to a new scheme.

As shown in FIG. 5, the parallel signal (P-DATA) and the parallel signal clock (P-CLK) are input from the baseband processor 110 to the serializer 134. The parallel signal that is input to the serializer 134 is converted into a serial signal by the P/S conversion unit 152. The serial signal that has been converted by the P/S conversion unit 152 is input to the encoder 192. The encoder 192 adds a header and the like to the serial signal and generates a transmission frame (see FIG. 11). Furthermore, the encoder 192 encodes the generated transmission frame by the encoding method of the new scheme described later, and generates a transmission signal.

Figure 6:
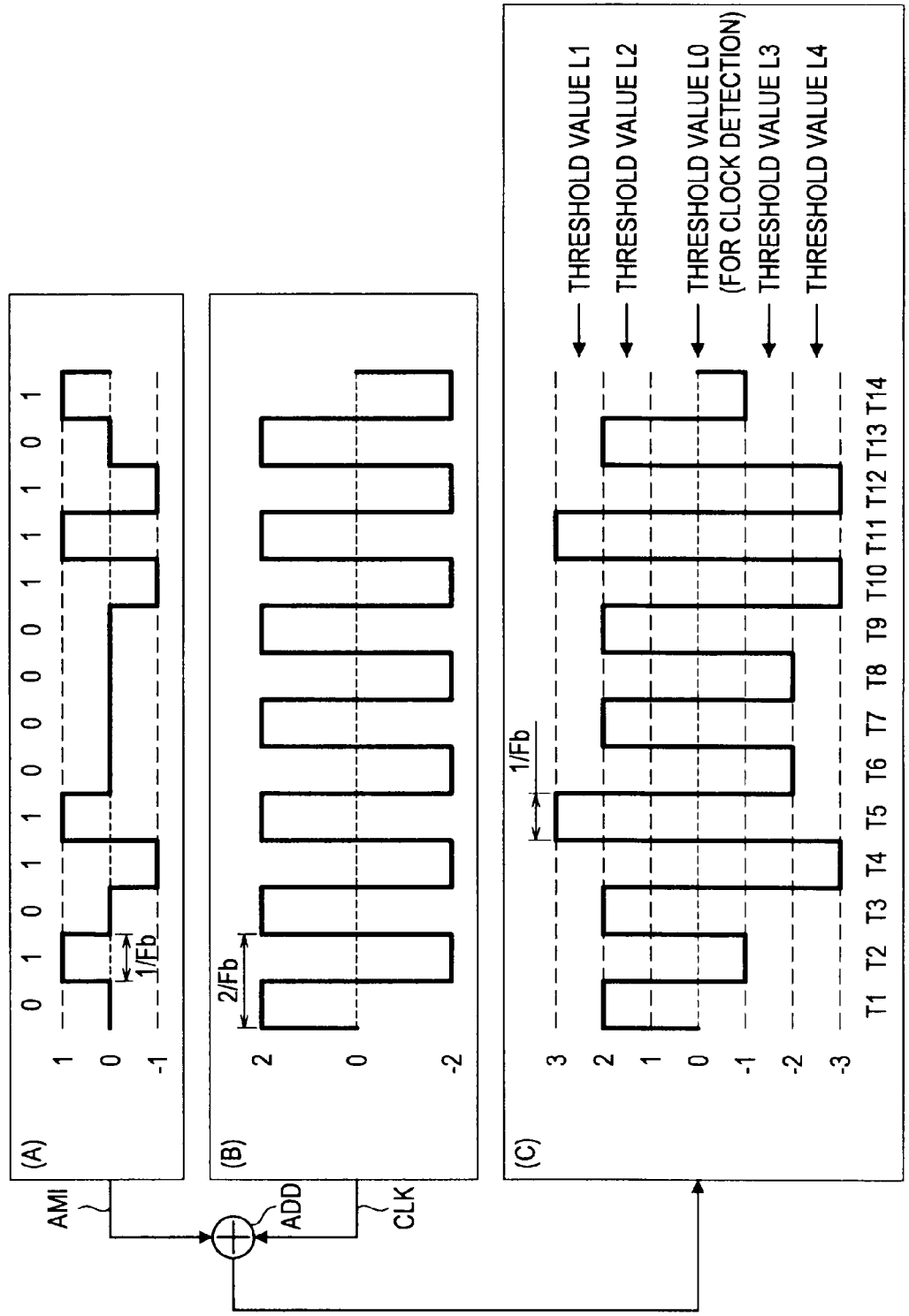
FIG. 6 is an explanatory diagram showing an example of a transmission signal (multilevel code) generation method and an amplitude determination method according to the new scheme.

Next, a method of generating the encoded signal by the encoder 192 will be described with reference to FIG. 6. FIG. 6 is an explanatory diagram showing an example of the encoding method of the new scheme. Additionally, FIG. 6 illustrates a method of generating a code for which the AMI code serves as a base. However, the new scheme is not limited to such, and it can be applied to any code having the same characteristics as the AMI code. For example, it can be applied to a bipolar code, a code according to a partial response scheme, and the like.

The signal that is shown in (C) of FIG. 6 is a signal that has been encoded by the encoding method of the new scheme. In this signal, data values 1 are expressed by a plurality of potentials A1 (−1, −3, 1, 3) and data values 0 are expressed by a plurality of potentials A2 (−2, 2) that are different from the potentials A1. Additionally, this signal is configured such that the polarities are inverted and also such that the same potential does not occur consecutively. For example, referring to the section where data values 0 occur consecutively in timings T6 to T9, the potentials are −2, 2, −2, 2. Using this sort of code makes it possible to regenerate the clock component by detecting both the rising and the falling edges, even if the same data value occurs consecutively.

Because the encoder 192 generates a code as described above, it is provided with an adder ADD. As shown in FIG. 6, the encoder 192, for example, encodes a serial signal that is input into an AMI code (A), and inputs the AMI code to the adder ADD. Furthermore, the encoder 192 generates a clock (B) having a frequency (2/Fb) half that of the transmission speed Fb of the AMI code, and inputs the clock to the adder ADD. Here, the amplitude of the clock is N times that of the AMI code (N>1; N=2 in the example in FIG. 6). The encoder 192 then adds the AMI code and the clock by using the adder ADD, and generates a code (C). At this time, the AMI code and the clock are synchronously added with their edges aligned.

The amplitude level of the code (C) obtained by synchronously adding the AMI code (A) and the clock (B) may take six values, i.e. 3, 2, 1, −1, −2, and −3, in the example showing in FIG. 6. That is, the transmission signal is a multilevel signal having six amplitude levels. Thus, the ranges of the amplitude levels of the transmission signal become wider compared to a case of transmitting the AMI code (A) as it is, and the transmission error becomes more likely to occur. This point will be described later in detail. Additionally, a configuration of synchronously adding the AMI code (A) and the clock (B) has been described here for the sake of simplicity of the explanation. However, the encoder 192 may be configured such that data is directly encoded into the waveform of the code (C). For example, in the case of FIG. 6, data sequence 0, 1, 0, 1, 1, 0, . . . , 1 may be directly converted into amplitude levels 2, −1, 2, −3, 3, −2, . . . , −1 by the encoder 192.

FIG. 5 will be again referred to. The serial signal that has been encoded by the encoder 192 in the manner described above is input to the LVDS driver 156. The LVDS driver 156 transmits the input serial signal to the deserializer 138 by a differential transmission scheme according to LVDS. On the other hand, a parallel signal clock input to the serializer 134 is input to the PLL unit 158. The PLL unit 158 generates a serial signal clock from the parallel signal clock, and inputs the serial signal clock to the P/S conversion unit 152 and the timing control unit 160. The timing control unit 160 controls the timing of the transmission of the serial signal by the encoder 192, based on the input serial signal clock. As described above, a serial signal is encoded and transmitted from the serializer 134 to the deserializer 138.

(Deserializer 138)

Next, the deserializer 138 will be described. As shown in FIG. 5, the deserializer 138 is mainly configured from the LVDS receiver 172, the S/P conversion unit 176, the timing control unit 182, a clock detection unit 196, and a decoder 194. The main point of difference from the general configuration described above is in the presence of the clock detection unit 196, which does not have a PLL.

As described above, the serial signal is transmitted from the serializer 134 to the deserializer 138 by the differential transmission scheme according to LVDS. The serial signal is received by the LVDS receiver 172. The serial signal received by the LVDS receiver 172 is input to the decoder 194 and the clock detection unit 196. The decoder 194 detects the beginning portion of the data by referring to the header of the input serial signal and decodes the serial signal that was encoded according to the encoding scheme used by the encoder 192.

Next, a method of decoding by the decoder 194 will be described by referring again to FIG. 6. As described above, the serial signal is encoded by the encoder 192 into a signal waveform of the code (C) having six amplitude levels. Thus, the decoder 194 can decode the original signal by performing threshold determination of determining whether the amplitude level of the received signal is A1 or A2. For example, four threshold values (L1, L2, L3, L4) that are shown in (C) in FIG. 6 are used to distinguish between amplitude level A1 (−1, −3, 1, 3), which corresponds to data value 1, and amplitude level A2 (−2, 2), which corresponds to data value 0. The decoder 194 first compares the amplitude level of the input signal to the four threshold values described above and determines whether the amplitude level is A1 or A2. Then, the decoder 194 decodes the original NRZ data based on the determination result and restores the serial signal that was transmitted.

FIG. 5 will be again referred to. The serial signal that has been decoded by the decoder 194 is input to the S/P conversion unit 176. The S/P conversion unit 176 converts the input serial signal into the parallel signal (P-DATA). The parallel signal that has been converted by the S/P conversion unit 176 is input to the liquid crystal unit 104. In case the parallel signal is an image signal, an image is displayed by the liquid crystal unit 104 based on the image signal.

Now, a clock becomes necessary to perform the above-described decoding process. Accordingly, the clock detection unit 196 detects the clock component in the signal input from the LVDS receiver 172. As has already been explained, the code (C) in FIG. 6 is obtained by synchronously adding the code (A) and the clock (B). Thus, this code (C) has a characteristic that the polarity is inverted every half cycle of the clock. When using this characteristic, the clock component is obtained by comparing the amplitude level and threshold level L0 (potential 0) and detecting the polarity inversion cycle of the amplitude. As a result, the clock detection unit 196 does not have to use a PLL at the time of detecting the clock component. Accordingly, a PLL does not have to be provided, and the power consumption and the circuit scale of the deserializer 138 can be reduced to that extent.

Now, the clock component detected by the clock detection unit 196 is input to the decoder 194 and the timing control unit 182. The clock component input to the decoder 194 is used at the time of performing an NRZ data decoding process according to the amplitude level determination for a multilevel code. Furthermore, the timing control unit 182 controls a reception timing based on the clock input from the clock detection unit 196. The clock (P-CLK) input to the timing control unit 182 is output to the liquid crystal unit 104.

The threshold determination performed by the decoder 194 and the clock detection unit 196 described above is realized by using a comparator, for example. The clock component is extracted at the clock detection unit 196 from the output result of a comparator in which threshold value is amplitude level 0. In contrast, the decoder 194 uses a comparator with four threshold levels, i.e. 2.5, 1.5, −1.5, and −2.5, to determine six amplitude levels, i.e. 3, 2, 1, −1, −2, and −3, for example. An amplitude level corresponding to each timing is determined based on the output results of these comparators. Also, the original NRZ data is decoded based on the determination result.

As described above, using a code which does not include a DC component and from which a clock component can be regenerated based on the polarity inversion cycle allows the deserializer 138 to perform clock detection without using a PLL, and thus, the power consumption of the mobile terminal 130 can be greatly reduced. Additionally, the above-described example illustrates a differential transmission scheme according to LVDS. However, a power superimposition scheme of superimposing a multilevel signal on a DC power signal and transmitting the same can also be used. According to this configuration, the range of movement of the connecting unit 106 can be further increased.

(Summary of Issues 2)

Heretofore, the functional configuration of the mobile terminal 130 according to the new scheme and the encoding/decoding method have been described. As described above, by using the encoding method according to the new scheme, the number of lines in the connecting unit 106 is greatly reduced, and also, significant effects such as the reduction in the circuit scale and the power consumption amount can be obtained. As has been explained, the new scheme has been developed to be used for signal transmission within a device. Such transmission line is significantly higher in quality than a radio channel. However, a transmission signal generated according to the encoding method of the new scheme is a multilevel signal expressing one bit value in a plurality of amplitude levels.

Figures 7, 8:
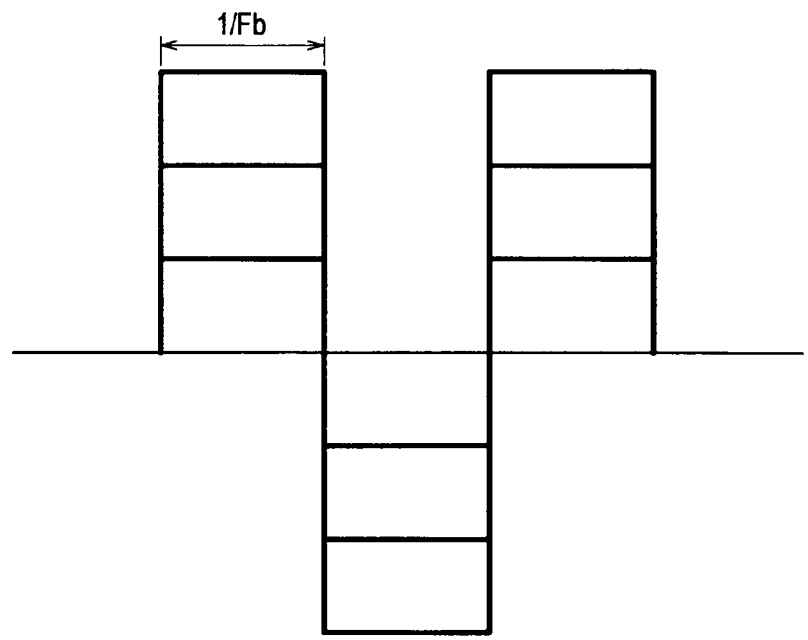
FIG. 7 is an explanatory diagram showing an example of an ideal eye pattern of a multilevel code (six levels)
FIG. 8 is an explanatory diagram showing a correspondence relationship between a coding rule for the AMI code and an amplitude change pattern for a multilevel code for which the AMI code serves as a base.

Accordingly, a SN ratio has to be about 10 dB higher than that of a generally used 2-level transmission signal expressing one bit value in one amplitude level. As a result, a transmission error may occur under the influence of unexpected external noise, noise occurring within the device, and the like. For example, the eye pattern of the above-described multilevel signal for which the AMI code serves as a base will have a form as shown in FIG. 7. However, FIG. 7 schematically shows an ideal eye pattern at the time point of generation of a multilevel code, and in reality, the edge portion may be rounded at the time of passing through a filter circuit having high-frequency cutoff characteristics, a transmission line or the like, or the waveform of the amplitude may be thick due to the noise in the transmission line or the like, and thus the eye pattern will take a form as shown in FIG. 10.

In the waveform in FIG. 7, the six amplitude levels, 3, 2, 1, −1, −2, and −3, are distinctly divided at an interval of height 1. Also, each amplitude level has a fixed width of 1/Fb. In case of such waveform, a correct amplitude level can be obtained no matter at which position the threshold determination of the amplitude level is performed as long as the threshold determination is performed within the width 1/Fb. That is, if a received signal and a clock are correctly synchronized, a correct amplitude level will be detected as a result of threshold determination based on the clock. However, in case of a waveform as shown in FIG. 10, the amplitude level will be different depending on the position to be sampled within the width 1/Fb corresponding to each amplitude level.

Figure 10:
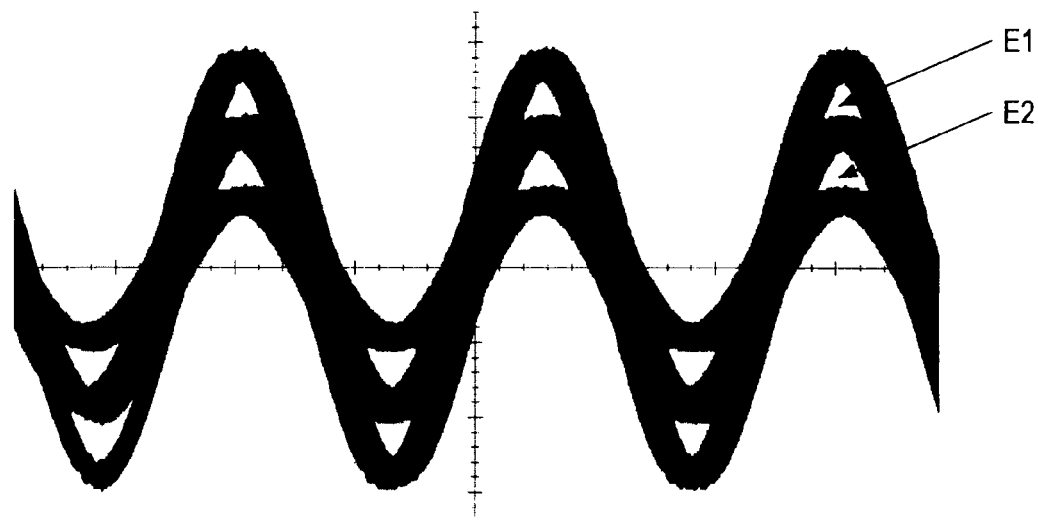
FIG. 10 is an explanatory diagram showing an example of an eye pattern of a multilevel code that is observed at the receiving side.

Also, as can be seen from the eye pattern in FIG. 10, the amplitude level itself has a width in the vertical axis direction. Thus, even if an amplitude level at a position which is supposed to have the same amplitude level is sampled, a different amplitude level is obtained depending on the timing of sampling. If the width is small, the result of the threshold determination performed using a threshold level set around the middle of each amplitude level will seldom indicate another amplitude level. However, if the width becomes large, a result of threshold determination might be different from the actual amplitude level.

The probability of such error occurring can be roughly estimated by the opening rate of an eye (for example, E1, E2) included in the eye pattern as shown in FIG. 10. The opening rate here means the opening area of the eye in comparison to the opening area of the ideal eye pattern shown in FIG. 7, for example. That is, the opening rate of the eye of the waveform shown in FIG. 7 is 100%. However, as shown in FIG. 10, the opening rate of each eye is normally reduced under the influence of high-frequency cutoff or the influence of noise or the like. Also, the transmission signal of the new scheme is a multilevel signal, and thus, the opening rate of the eye corresponding to a position at a high amplitude level is further greatly reduced.

For example, the opening rate of the eye E1 appearing between amplitude levels 2 and 3 is lower than that of the eye E2 appearing between amplitude levels 1 and 2. Similarly, the opening rate of the eye appearing between amplitude levels −2 and −3 is lower than that of the eye appearing between amplitude levels −1 and −2. Therefore, an error tends to occur in the threshold determination of amplitude levels 3 and −3. Similarly, an error is more likely to occur in a case of performing the threshold determination of amplitude levels 2 and −2 than in a case of determining amplitude levels 1 and −1. That is, the probability of an error occurring in the threshold determination is higher in case of transmitting the multilevel signal according to the new scheme than in case of transmitting, as it is, a transmission signal having the waveform of the AMI code.

Accordingly, it is conceivable to perform an error correction to cope with a transmission error occurring in this manner. Normally, to improve transmission quality, an error correction code such as a convolutional code is added to transmission data, and the receiving side performs the error correction. However, a transmission line with relatively high transmission quality is assumed, and it would be excessive to perform a high-level error correction using a convolutional code or the like on a small transmission error occurring in such transmission line. Also, such error correction will increase the power consumption and the circuit scale, and therefore is not desirable. Thus, an error correction method which is capable of improving the transmission quality without adding a special error correction code is desired.

2: Embodiment

The technology described below has been devised in view of the issues as described above. Hereunder, an embodiment of the present invention will be described. The present embodiment proposes an error correction method which is capable of further improving the transmission quality without adding a special error correction code to transmission data in an environment where the transmission quality is relatively high. More specifically, a coding rule violation is detected from the pattern of the amplitude level obtained by threshold determination at the receiving side, and an error correction is performed so as to resolve the coding rule violation. Hereunder, a more detailed description will be given while referring to a multilevel code for which the AMI code serves as a base as a concrete example.

(2-1: AMI Coding Rule and Amplitude Pattern of Multilevel Code)

First, a relationship between an AMI coding rule and the amplitude pattern of a multilevel code based on the AMI coding rule, and the coding rule violation in the multilevel code will be described with reference to FIG. 8. FIG. 8 is an explanatory diagram for describing the relationship between the AMI coding rule and the amplitude pattern of the multilevel code based on the AMI coding rule, and for describing the coding rule violation in the multilevel code.

FIG. 8 describes, in the form of a table, the amplitude level of an AMI code (AMI data), the amplitude level of a clock (CLOCK) to be synchronously added to the AMI code, and the amplitude level of a multilevel code (final code). Additionally, the multilevel code (C) of the new scheme shown in FIG. 6 is generated from the AMI code (A) and the clock (B) based on the coding rule shown in FIG. 8.

First, rows of AMI data 1 will be referred to. The rows of AMI data 1 are associated with CLOCKs 2 and −2. Also, final code 3 is associated with CLOCK 2. Similarly, final code −1 is associated with CLOCK −2. This indicates that final code 3 is obtained as a result of adding CLOCK 2 to AMI data 1. Similarly, it is indicated that final code −1 is obtained as a result of adding CLOCK −2 to AMI data 1.

Next, rows of AMI data 0 will be referred to. The rows of AMI data 0 are associated with CLOCKs 2 and −2. Also, final code 2 is associated with CLOCK 2. Similarly, final code −2 is associated with CLOCK −2. This indicates that final code 2 is obtained as a result of adding CLOCK 2 to AMI data 0. Similarly, it is indicated that final code −2 is obtained as a result of adding CLOCK −2 to AMI data 0.

Next, rows of AMI data −1 will be referred to. The rows of AMI data −1 are associated with CLOCKs 2 and −2. Also, final code 1 is associated with CLOCK 2. Similarly, final code −3 is associated with CLOCK −2. This indicates that final code 1 is obtained as a result of adding CLOCK 2 to AMI data −1. Similarly, it is indicated that final code −3 is obtained as a result of adding CLOCK −2 to AMI data −1.

The AMI coding rule will be again described for the sake of clarification. The AMI coding rule is to express data value 1 by amplitude level 1 or −1, and to express data value 0 by amplitude level 0. The characteristic of the AMI coding rule lies in that the amplitude level of the previously input data value 1 is referred to at the time of encoding data value 1. Specifically, if the previously input data value 1 was encoded to have amplitude level 1, the currently input data 1 will be encoded to have amplitude level −1. Similarly, if the previously input data 1 was encoded to have amplitude level −1, the currently input data 1 will be encoded to have amplitude level 1. Accordingly, an amplitude pattern with consecutive amplitude levels 1 or an amplitude pattern with consecutive amplitude levels −1 is not possible.

Such impossible amplitude patterns will be referred to as the coding rule violations. The AMI coding rule violation is as described above. Furthermore, the multilevel code of the new scheme for which the AMI code serves as a base inherits the AMI coding rule. Accordingly, a coding rule violation based on the AMI coding rule violation also exists for the multilevel code of the new scheme. As described above, according to the AMI coding rule, a pattern (1, 1) where amplitude levels 1 occur consecutively is a coding rule violation. When a clock (2, −2) is synchronously added to this pattern of the AMI code, a pattern (3, −1) is obtained for a multilevel code. That is, a pattern (3, −1) is a coding rule violation for the multilevel code of the new scheme for which the AMI code serves as a base.

Similarly, according to the AMI coding rule, a pattern (−1, −1) where amplitude levels −1 occur consecutively is a coding rule violation. When a clock (2, −2) is synchronously added to this pattern of the AMI code, a pattern (1, −3) is obtained for a multilevel code. That is, a pattern (1, −3) is a coding rule violation for the multilevel code of the new scheme for which the AMI code serves as a base. Additionally, when taking into consideration also a case of synchronously adding a clock (−2, 2), at least four patterns, (3, −1), (1, −3), (−1, 3) and (−3, 1) are coding rule violations relating to the above-described multilevel code of the new scheme. It should be noted that there is also a pattern where amplitude level 0 exists inbetween, such as a pattern (1, 0, 1), for the coding rule violation in the AMI code.

The coding rule violation as described above does not usually occur unless intended by the transmitting side. However, if the result of a threshold determination includes an error, the coding rule violation as described above may occur. Accordingly, the present embodiment proposes a method of detecting a coding rule violation in the multilevel code as described above at the receiving side and of performing error correction so as to resolve the coding rule violation. However, as has already been explained, the transmission line assumed in the present embodiment is significantly higher in transmission quality than a radio channel and the like. Accordingly, it would be enough if an error of one bit or of a several bits in one transmission frame can be corrected. Thus, the present embodiment proposes a method of detecting the coding rule violation as illustrated in FIG. 8 and of performing error correction according to the detection result.

As described above, a pattern such as a pattern (1, 0, 1) also exists for the coding rule violation in the AMI code. To detect such pattern, information relating to the polarity (+/−) of the amplitude level corresponding to previously detected data 1 has to be held. Also, it becomes necessary to determine at which timing of the pattern (1, 0, 1) the error occurred. If the results of the threshold determination corresponding to amplitude level 0 of the AMI code are numerous, the process of determining at which timing the error occurred becomes complicated. As a result, the circuit scale and the power consumption will be increased.

Thus, the present embodiment does not aim for perfect error correction but aims to improve the transmission quality by correcting at least a part of the errors. For this reason, there is a merit that the application of the error correction method of the present embodiment hardly increases the circuit scale and the power consumption, and also, that it can be implemented relatively easily.

(2-2: Error Detection Method)

Figure 9:
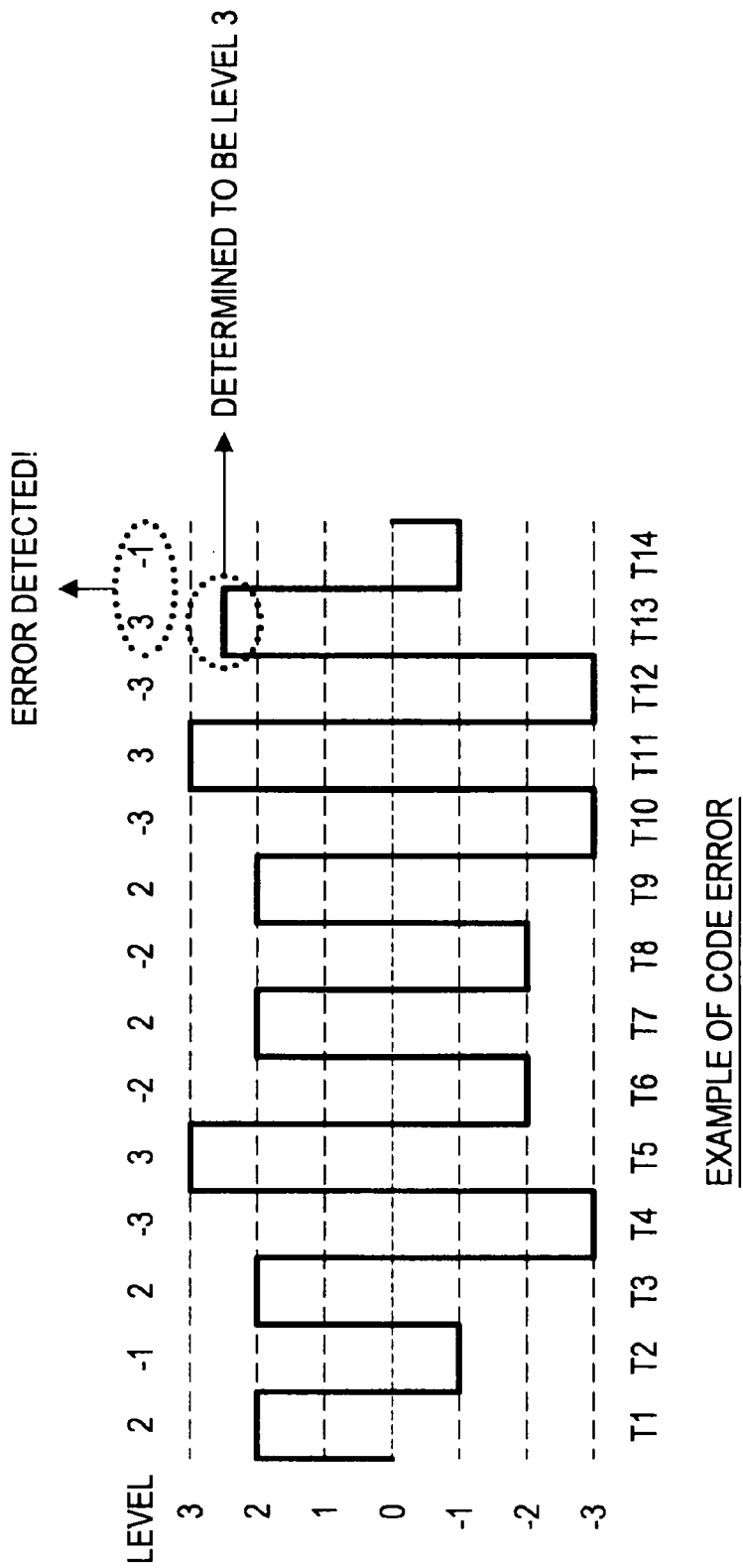
FIG. 9 is an explanatory diagram showing a concept of an error detection method according to an embodiment of the present invention.

Here, the error detection method according to the present embodiment will be described more concretely with reference to FIG. 9. FIG. 9 schematically shows a received waveform which includes a code error. The waveform shown in FIG. 9 is that which is obtained at the receiving side when the multilevel code (C) in FIG. 6 is transmitted. In this example, the amplitude level at timing T13 is affected by a noise or the like. As shown in FIG. 6, the amplitude level at timing T13 is originally 2. However, in the example of FIG. 9, the amplitude level at timing T13 is between 2 and 3 and rather near to 3. Thus, when the threshold determination is performed, the amplitude level will be determined to be 3.

Such erroneous determination makes the pattern of the amplitude levels at timings T13 and T14 (3, −1). This amplitude pattern corresponds to a coding rule violation in the multilevel code as shown in FIG. 8. Accordingly, it is estimated based on the detection of this coding rule violation that an error has occurred at either timing T13 or T14. According to the present embodiment, an error is detected by using such method, and the detected error is corrected. In the example of FIG. 9, an error is rectified by correcting either of the amplitude levels at timings T13 and T14.

As has been described, the transmission characteristics of the transmission line assumed in the present embodiment is relatively good. Accordingly, a grave error of an amplitude level by two levels or more rarely occurs. Conversely, in a situation where such grave error occurs, a sufficient effect is not obtained by the error correction method of the present embodiment because the errors occur randomly and frequently. For this reason, the present embodiment takes into consideration only a correction to an adjacent amplitude level. For example, in the example of FIG. 9, amplitude level 3 detected at timing T13 may be corrected to amplitude level 2. Also, amplitude level −1 detected at timing T14 may be corrected to amplitude level −2. Additionally, the error correction method according to the present embodiment will be described later in detail.

Figure 11:
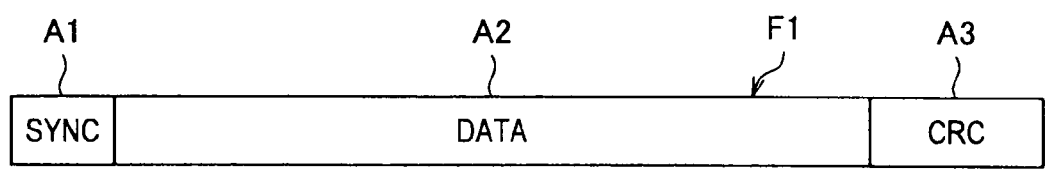
FIG. 11 is an explanatory diagram showing an example of a frame structure of a transmission frame.

As described above, the error detection method according to the present embodiment is based on the coding rule violation in a multilevel code. However, also in the present embodiment, data transmission is performed in many cases with a CRC (Cyclic Redundancy Check) added to a transmission frame as shown in FIG. 11. Accordingly, error detection can also be additionally performed by the CRC. By using the error detection by the CRC, whether the error correction by the present embodiment based on the coding error violation is accurate or not can also be checked. These methods will be described later. Here, referring to FIG. 11, a frame structure of the transmission frame will be simply described.

FIG. 11 is an example of the frame structure used at the time of transmitting data. This transmission frame F1 includes a synchronization code (SYNC) A1, data A2 and a CRC code A3. As will be described later, the transmission frame F1 is encoded into the multilevel code described above, and is transmitted as a multilevel signal. Additionally, the synchronization code A1 is a specific synchronization pattern indicating the beginning position of the transmission frame A1. The data A2 is transmission target data. For example, when being used for an application for a mobile phone or the like, image data to be transmitted to the liquid crystal unit 104 and various control data for controlling the display unit 102 will be included as the data A2. The CRC code A3 is used for the error detection for the data A2. Normally, a CRC code A3 having a code length of about 16 bits or 32 bits is used.

(2-3: Functional Configuration of Mobile Terminal 200)

Next, the functional configuration of a mobile terminal 200 capable of performing the error detection method and the error correction method according to the present embodiment will be described with reference to FIG. 12. FIG. 12 is an explanatory diagram showing a functional configuration example of the mobile terminal 200 according to the present embodiment. Description of portions that are substantially the same of those of the mobile terminal 130 of the new scheme shown in FIG. 5 will be simplified or will be omitted.

Figure 12:
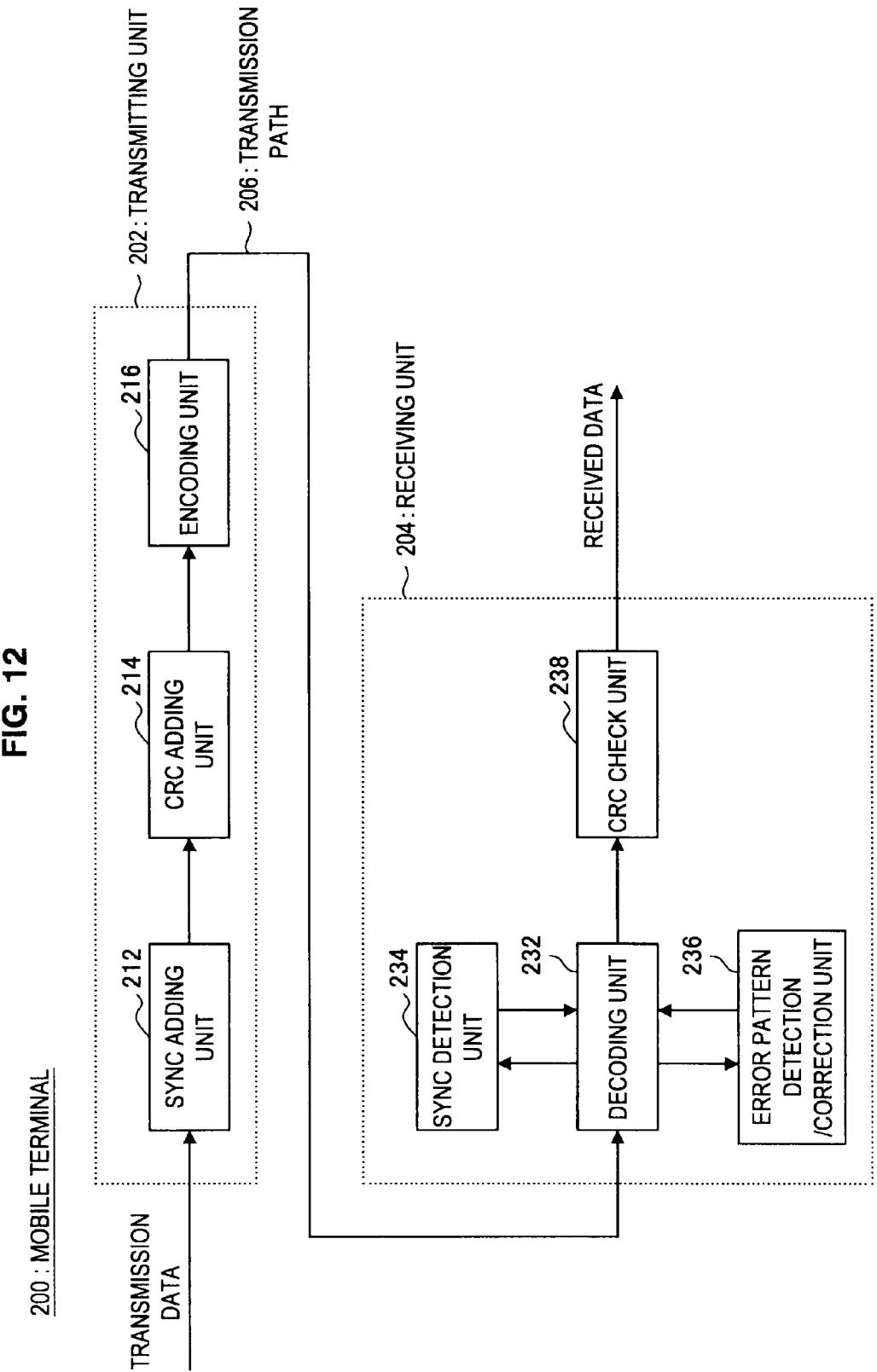
FIG. 12 is an explanatory diagram showing a functional configuration example of a mobile terminal according to the present embodiment.

As shown in FIG. 12, the mobile terminal 200 is mainly configured from a transmitting unit 202 and a receiving unit 204. Furthermore, the transmitting unit 202 and the receiving unit 204 are connected by a transmission line 206. For example, a coaxial cable or a twisted pair cable is used as the transmission line 206. In case of transmitting the multilevel signal described above with power superimposed thereon, a coaxial cable is used. Furthermore, the transmitting unit 202 is mainly provided with a SYNC adding unit 212, a CRC adding unit 214 and an encoding unit 216. Also, the receiving unit 204 is provided with a decoding unit 232, a SYNC detection unit 234, an error pattern detection/correction unit 236, and a CRC check unit 238.

First, 2-level transmission data (NRZ data) is input to the SYNC adding unit 212. When the transmission data is input, the SYNC adding unit 212 adds a synchronization code to the transmission data. The transmission data to which the synchronization code has been added is input to the CRC adding unit 214. When the transmission data to which the synchronization code has been added is input, the CRC adding unit 214 adds a CRC code to the transmission data. A transmission frame having a structure as shown in FIG. 11 is generated by adding a synchronization code and a CRC code to transmission data in this manner. The generated transmission frame is input to the encoding unit 216.

When the transmission frame is input, the encoding unit 216 converts the input transmission frame into an AMI code based on the AMI coding rule. Furthermore, the encoding unit 216 converts the AMI code into a multilevel code based on the coding rule shown in FIG. 8. That is, the encoding unit 216 generates a multilevel code waveform that is obtained by synchronously adding a clock to an AMI code waveform. By generating data in a multilevel code from data in the AMI code based on the table of FIG. 8 in this manner, it becomes unnecessary to actually perform signal processing of synchronously adding the signal waveform of the AMI code and the signal waveform of the clock. That is, by modulating a carrier based on the data in the final code shown in FIG. 8, a transmission signal (multilevel signal) based on the multilevel code is generated. Of course, the multilevel signal may be generated by synchronously adding, by signal processing, the clock signal and a data signal based on the AMI code.

The multilevel signal obtained in this manner is transmitted to the receiving unit 204 through the transmission line 206. When the multilevel signal reaches the receiving unit 204, it is first input to the decoding unit 232. The decoding unit 232 performs the threshold determination by a comparator or the like and detects the amplitude level of the multilevel signal. Furthermore, the decoding unit 232 decodes the 2-level transmission data from the data in the multilevel code based on the detected amplitude level. At this time, the decoding unit 232 converts from the data in the multilevel code to the data in the AMI code by using the coding rule shown in FIG. 8, decodes the obtained data in the AMI code based on the AMI coding rule, and generates 2-level data corresponding to the transmission frame. The 2-level data generated at the decoding unit 232 (hereinafter, decoded data) is input to the SYNC detection unit 234.

When the decoded data is input, the SYNC detection unit 234 detects the synchronization code from the decoded data, and detects the beginning portion of the transmission frame. Then, the SYNC detection unit 234 inputs to the decoding unit 232 the data and the CRC code following the synchronization code. When the detection of the synchronization code by the SYNC detection unit 234 is completed in this manner, the decoding unit 232 performs error correction on the input data. First, the decoding unit 232 inputs the amplitude data of the multilevel code and the decoded data to the error pattern detection/correction unit 236. The error pattern detection/correction unit 236 checks the amplitude pattern of the multilevel code and detects the coding error violation. At this time, the error pattern detection/correction unit 236 detects a portion where the amplitude pattern of consecutive two bits is any of (3, −1), (1, −3), (−1, 3) and (−3, 1).

When no coding rule violation is detected, the decoded data is input to the CRC check unit 238 as it is. In contrast, if any of the amplitude patterns mentioned above is detected, the error pattern detection/correction unit 236 corrects the decoded data based on a correction rule shown in FIG. 13. For example, when a pattern (3, −1) is detected, the error pattern detection/correction unit 236 presumes that the pattern of the correct amplitude level is (2, −1), and corrects the decoded data of the corresponding bits to (0, 1). Similarly, when a pattern (−1, 3) is detected, the error pattern detection/correction unit 236 presumes that the pattern of the correct amplitude level is (−1, 2), and corrects the decoded data of the corresponding bits to (1, 0).

Furthermore, when a pattern (1, −3) is detected, the error pattern detection/correction unit 236 presumes that the pattern of the correct amplitude level is (1, −2), and corrects the decoded data of the corresponding bits to (1, 0). Furthermore, when a pattern (−3, 1) is detected, the error pattern detection/correction unit 236 presumes that the pattern of the correct amplitude level is (−2, 1), and corrects the decoded data of the corresponding bits to (0, 1). The decoded data corrected in this manner is input from the error pattern detection/correction unit 236 to the decoding unit 232.

The decoding unit 232 inputs the decoded data which has been corrected by the error pattern detection/correction unit 236 and the CRC code to the CRC check unit 238. The CRC check unit 238 performs error check on the decoded data based on the input CRC code. The error detection and the error correction by the error pattern detection/correction unit 236 are performed only to detect a bit having a high probability of being an error and to correct a detected value. Thus, the CRC check is performed to check whether the decoded data after the error correction is truly correct. Additionally, whether the error correction by the error pattern detection/correction unit 236 is correct or incorrect can be checked by the error detection performed by the CRC check unit 238. The decoded data for which an error has been detected by the CRC check unit 238 is discarded, or is output, as it is, as received data.

The decoded data for which the error check has been performed by the CRC check unit 238 is output as received data to other structural elements. For example, when the transmitting unit 202 corresponds to the serializer 134 described above and the receiving unit 204 corresponds to the deserializer 138 described above, the received data is output towards the liquid crystal unit 104 and the like. Additionally, the error correction by the error pattern detection/correction unit 236 is performed, assuming correction of an error of about one bit in a transmission frame. Thus, it is sufficient to perform this error correction about one time for each transmission frame. In case the pattern of the coding rule violation is detected two times or more, the errors are detected by the CRC check by the CRC check unit 238.

Heretofore, the functional configuration of the mobile terminal 200 according to the present embodiment has been described. As described above, with the error pattern detection/correction unit 236 being provided, a transmission error can be corrected and the transmission quality can be further improved. Furthermore, the error pattern detection/correction unit 236 only detects the coding rule violation based on the amplitude pattern, selects a specific amplitude pattern which will resolve the detected coding rule violation, and performs an error correction corresponding to the amplitude pattern. Thus, no special error correction code has to be added at the transmitting unit 202, and also, the circuit scale of the receiving unit 204 is barely increased.

(2-4: Error Correction Method)

Here, a supplementary explanation will be given for the error correction method according to the present embodiment with reference to FIG. 13. FIG. 13 shows a method of error correction in relation to four amplitude patterns which are coding rule violations. First, attention will be focused on an amplitude level pattern (3, −1) before correction, which is a coding rule violation. In the case of this pattern, either the amplitude level 3 or −1 is an error.

However, as described above with reference to FIG. 10, the opening rate of the eye E1 between amplitude levels 3 and 2 is small compared to the eye E2 between amplitude levels 2 and 1. Thus, the possibility of amplitude level 3 being mistaken for amplitude level 2 is higher than the possibility of amplitude level 1 being mistaken for amplitude level 2 (the possibility of mistaking amplitude level −1 for amplitude level −2). Thus, if the pattern (3, −1), which is a coding rule violation, is detected, the present embodiment presumes that the pattern is actually (2, −1), and corrects the corresponding decoded data to (0, 1).

For the same reason, when a pattern (−1, 3), which is a coding rule violation, is detected, it is presumed that the pattern is actually (−1, 2), and the corresponding decoded data is corrected to (1, 0). Furthermore, when a pattern (1, −3), which is a coding rule violation, is detected, it is presumed that the pattern is actually (1, −2), and the corresponding decoded data is corrected to (1, 0). Also, when a pattern (−3, 1), which is a coding rule violation, is detected, it is presumed that the pattern is actually (−2, 1), and the corresponding decoded data is corrected to (0, 1). According to this configuration, one correction result can be uniquely specified from one error pattern, and processing burden for the error correction can be reduced.

Heretofore, the error correction method according to the present embodiment has been described. In the explanation above, a multilevel code for which the AMI code serves as a base has been consistently taken as an example for the sake of explanation. However, the application scope of the present embodiment is not limited to the AMI code, and it can be applied to any code based on any coding scheme as long as a waveform having characteristics equivalent to those according to the new scheme can be formed. For example, it can be applied to a partial response code, a Coded Mark Inversion (CMI) code, and the like.

3: Modified Example

Here, a modified example according to the present embodiment will be described. In the above explanation, a method of using correction patterns shown in FIG. 13 and performing the error correction on the amplitude level 3 or −3 of the multilevel code has been proposed as the error correction method. However, depending on the circuit scale and the processing capacity of the receiving unit 204, it is sometimes preferable that the error correction is performed while taking into consideration other amplitude levels as well. As a matter of course, by taking into consideration other amplitude levels as well, the error correction ability is increased. Accordingly, the error correction method to be used is to be selected as appropriate depending on the mode of the embodiment. Hereunder, a modified example configured to take into consideration other amplitude levels as well will be described.

(3-1: Functional Configuration of Mobile Terminal 200)

Figure 14:
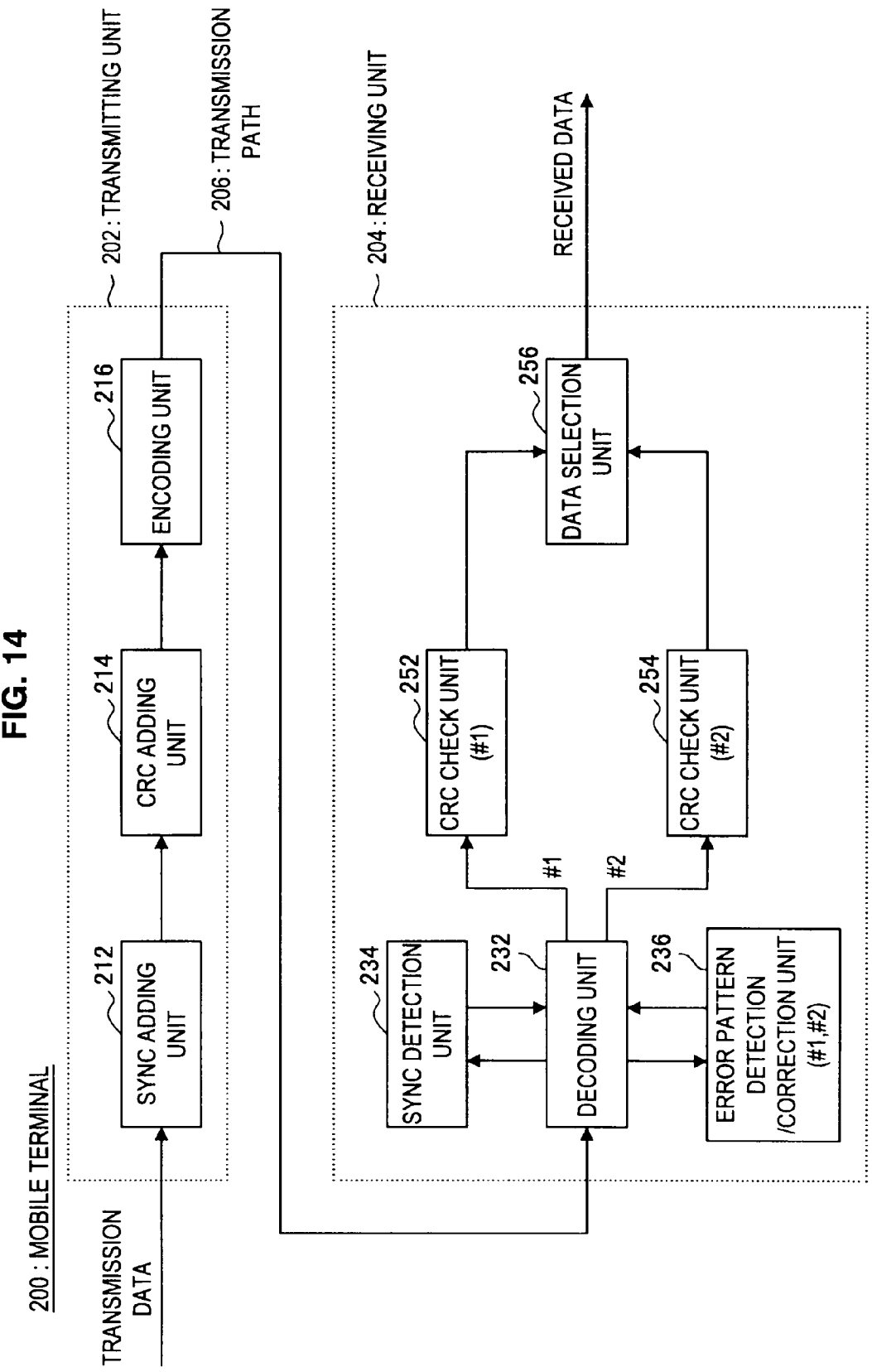
FIG. 14 is an explanatory diagram showing a functional configuration example of a mobile terminal according to a modified example of the present embodiment.

First, the functional configuration of the mobile terminal 200 will be described with reference to FIG. 14. FIG. 14 is an explanatory diagram showing a functional configuration example of the mobile terminal 200 according to this modified example. Additionally, structural elements that have substantially the same function as those of the mobile terminal 200 shown in FIG. 12 are denoted with the same reference numerals, and detailed explanation of these structural elements is omitted.

As shown in FIG. 14, the mobile terminal 200 is mainly configured from the transmitting unit 202 and the receiving unit 204. Furthermore, the transmitting unit 202 and the receiving unit 204 are connected by the transmission line 206. Furthermore, the transmitting unit 202 is mainly provided with the SYNC adding unit 212, the CRC adding unit 214 and the encoding unit 216. Accordingly, the functional configuration of the transmitting unit 202 is substantially the same as that of the mobile terminal 200 shown in FIG. 12. Also, the receiving unit 204 is provided with the decoding unit 232, the SYNC detection unit 234, the error pattern detection/correction unit 236, CRC check units 252, 254, and a data selection unit 256.

First, a multilevel signal is transmitted to the receiving unit 204 through the transmission line 206. When the multilevel signal reaches the receiving unit 204, it is input to the decoding unit 232. The decoding unit 232 performs threshold determination by a comparator or the like and detects the amplitude level of the multilevel signal. Furthermore, the decoding unit 232 decodes the 2-level transmission data from the data in the multilevel code based on the detected amplitude level. At this time, the decoding unit 232 converts from the data in the multilevel code to the data in the AMI code by using the coding rule shown in FIG. 8, decodes the obtained data in the AMI code based on the AMI coding rule, and generates 2-level data corresponding to a transmission frame. The 2-level data generated at the decoding unit 232 (hereinafter, decoded data) is input to the SYNC detection unit 234.

When the decoded data is input, the SYNC detection unit 234 detects the synchronization code from the decoded data, and detects the beginning portion of the transmission frame. Then, the SYNC detection unit 234 inputs to the decoding unit 232 the data and the CRC code following the synchronization code. When the detection of the synchronization code by the SYNC detection unit 234 is completed in this manner, the decoding unit 232 performs error correction on the input data. First, the decoding unit 232 inputs the amplitude data of the multilevel code and the decoded data to the error pattern detection/correction unit 236. The error pattern detection/correction unit 236 checks the amplitude pattern of the multilevel code and detects the coding error violation. At this time, the error pattern detection/correction unit 236 detects a portion where the amplitude pattern of consecutive two bits is any of (3, −1), (1, −3), (−1, 3) and (−3, 1).

When no coding rule violation is detected, the decoded data is input as it is to the CRC check unit 252 (#1) or the CRC check unit 254 (#2). In contrast, if any of the amplitude patterns mentioned above is detected, the error pattern detection/correction unit 236 corrects the decoded data based on correction rules (#1), (#2) shown in FIG. 15.

For example, when a pattern (3, −1) is detected, the error pattern detection/correction unit 236 presumes that the pattern of the correct amplitude level as a first candidate is (2, −1), and corrects the decoded data of the corresponding bits to (0, 1) (#1). Then the error pattern detection/correction unit 236 feeds back the decoded data corrected based on (#1) to the decoding unit 232 as a decoded data candidate (#1). Furthermore, the error pattern detection/correction unit 236 presumes that the pattern of the correct amplitude level as a second candidate is (3, −2), and corrects the decoded data of the corresponding bits to (1, 0) (#2). Then the error pattern detection/correction unit 236 feeds back the decoded data corrected based on (#2) to the decoding unit 232 as a decoded data candidate (#2).

Similarly, when a pattern (−1, 3) is detected, the error pattern detection/correction unit 236 presumes that the pattern of the correct amplitude level as a first candidate is (−1, 2), and corrects the decoded data of the corresponding bits to (1, 0) (#1). Then the error pattern detection/correction unit 236 feeds back the decoded data corrected based on (#1) to the decoding unit 232 as a decoded data candidate (#1). Furthermore, the error pattern detection/correction unit 236 presumes that the pattern of the correct amplitude level as a second candidate is (−2, 3), and corrects the decoded data of the corresponding bits to (0, 1) (#2). Then the error pattern detection/correction unit 236 feeds back the decoded data corrected based on (#2) to the decoding unit 232 as a decoded data candidate (#2).

Similarly, when a pattern (1, −3) is detected, the error pattern detection/correction unit 236 presumes that the pattern of the correct amplitude level as a first candidate is (1, −2), and corrects the decoded data of the corresponding bits to (1, 0) (#1). Then the error pattern detection/correction unit 236 feeds back the decoded data corrected based on (#1) to the decoding unit 232 as a decoded data candidate (#1). Furthermore, the error pattern detection/correction unit 236 presumes that the pattern of the correct amplitude level as a second candidate is (2, −3), and corrects the decoded data of the corresponding bits to (0, 1) (#2). Then the error pattern detection/correction unit 236 feeds back the decoded data corrected based on (#2) to the decoding unit 232 as a decoded data candidate (#2).

Similarly, when a pattern (−3, 1) is detected, the error pattern detection/correction unit 236 presumes that the pattern of the correct amplitude level as a first candidate is (−2, 1), and corrects the decoded data of the corresponding bits to (0, 1) (#1). Then the error pattern detection/correction unit 236 feeds back the decoded data corrected based on (#1) to the decoding unit 232 as a decoded data candidate (#1). Furthermore, the error pattern detection/correction unit 236 presumes that the pattern of the correct amplitude level as a second candidate is (−3, 2), and corrects the decoded data of the corresponding bits to (1, 0) (#2). Then the error pattern detection/correction unit 236 feeds back the decoded data corrected based on (#2) to the decoding unit 232 as a decoded data candidate (#2).

The decoding unit 232 inputs the decoded data corrected by the error pattern detection/correction unit 236 and the CRC code to the CRC check units 252, 254. At this time, the decoding unit 232 inputs the decoded data obtained from the error patter detection/correction unit 236 as the first candidate to the CRC check unit 252 (#1). Similarly, the decoding unit 232 inputs the decoded data obtained from the error pattern detection/correction unit 236 as the second candidate to the CRC check unit 254 (#2). The CRC check units 252, 254 perform error check on the decoded data based on the input CRC codes. The check results and the decoded data output from the CRC check units 252, 254 are input to the data selection unit 256.

When the check results are input from the CRC check units 252, 254, the data selection unit 256 discards a decoded data candidate for which an error is detected by a CRC check, and selects and outputs a correct decoded data candidate. Additionally, in case both decoded data candidates are confirmed to be errors by the CRC check, the data selection unit 256 randomly selects a decoded data candidate and outputs the same. The data output from the data selection unit 256 is output to other structural element. For example, when the transmitting unit 202 corresponds to the serializer 134 described above and the receiving unit 204 corresponds to the deserializer 138 described above, the received data is output towards the liquid crystal unit 104 and the like.

Heretofore, the functional configuration of the mobile terminal 200 according to a modified example of the present embodiment has been described. As described above, in this modified example, the error correction method to be performed by the error pattern detection/correction unit 236 is changed. Specifically, since error correction is performed based on the table shown in FIG. 15, errors occurring at amplitude levels 1 and −1 can also be corrected. As a result, the error correction ability can be increased compared to the error correction method shown in FIG. 13.

4: Conclusion

Lastly, the functional configuration of the signal processing device of the present embodiment, and the effects obtained by the functional configuration will be briefly summarized.

First, the functional configuration of the signal processing device according to the present embodiment can be expressed as follows. The signal processing device includes a signal receiving unit, an amplitude level detection unit, a violation detection unit, and an error correction unit as described below.

The signal receiving unit mentioned above is for receiving a multilevel signal having a signal waveform that is obtained by synchronously adding an encoded signal which is generated based on a specific coding rule and a clock which has an amplitude larger than the encoded signal and for which the transmission speed is half that of the encoded signal.

In this manner, the signal processing device receives a multilevel signal by the above-described signal receiving unit. As described, the multilevel signal has a signal waveform that is obtained by synchronously adding an encoded signal and a clock. When such signal waveform that is obtained by synchronously adding a clock is used, the clock can be regenerated by detecting the polarity inversion cycle of the amplitude level. Accordingly, a PLL does not have to be provided at the receiving side, and the amount of power consumption can be greatly reduced. Also, a PLL does not have to be provided, and the circuit scale can be reduced to that extent.

Also, the amplitude level detection unit mentioned above is for detecting the amplitude level of the multilevel signal received by the signal receiving unit.

The amplitude level of the above-described multilevel signal is determined based on a plurality of threshold levels that are set in advance. At this time, an error may occur in the determination result of the amplitude level. As described above, the waveform of the amplitude level of the multilevel signal becomes thicker than for an encoded signal on which a clock is not superimposed. Accordingly, a transmission error tends to occur for a high amplitude level in a transmission line. For this reason, in case of using the multilevel signal, an error tends to occur in the determination result of the amplitude level by the amplitude level detection unit compared to a case where the encoded signal is transmitted as it is. Thus, the above-described signal processing device has the violation detection unit and the error correction unit which are described in the following.

The violation detection unit mentioned above is for detecting a bit position at which rule violation of the specific coding rule occurred, based on a change pattern of the amplitude level detected by the amplitude level detection unit. Also, the error correction unit mentioned above is for correcting the detection value of the amplitude level corresponding to the bit position detected by the violation detection unit so that the rule violation is resolved.

In this manner, by detecting the coding rule violation by referring to the change pattern of the amplitude level, a position at which a transmission error occurred can be detected. Also, by correcting the detection value of the amplitude level such that the coding rule violation is resolved, the transmission error can be corrected. Additionally, in case the transmission quality of the transmission line through which the multilevel signal is transmitted is relatively high, the proportion of error bits included in a received multilevel signal is small. Accordingly, the transmission quality can be sufficiently improved by performing the error correction on the bit position at which the coding rule violation had occurred.

Furthermore, even if the error correction process at the signal processing device is added, the circuit scale is hardly increased. Thus, the technology is suitably used in a device for which it is desired to use a multilevel signal and to omit a PLL at the receiving side. For example, the technology relating to the above-described signal processing device is suitably used in a mobile phone, a portable information terminal, a portable game machine, a small notebook PC and the like, and a small electronic device.

(Remarks)

The above-described receiving unit 204 is an example of the signal receiving unit. Also, the above-described decoding unit 232 is an example of the amplitude level detection unit. Also, the above-described error pattern detection/correction unit 236 is an example of the violation detection unit and the error correction unit.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-113892 filed in the Japan Patent Office on May 8, 2009, the entire content of which is hereby incorporated by reference.

What is claimed is:

1. A signal processing device comprising:
   a wired interface that receives a multilevel signal having a signal waveform that is obtained by synchronously adding an encoded signal generated based on a specific coding rule and a clock which has an amplitude larger than the encoded signal and for which the transmission speed is half that of the encoded signal; and
   processing circuitry that
      detects an amplitude level of the multilevel signal received by the wired interface;
      detects a bit position at which rule violation of the specific coding rule occurred, based on a detected change pattern of the amplitude level; and
      corrects a detection value of the amplitude level corresponding to the detected bit position so that the rule violation is resolved.

2. The signal processing device according to claim 1, wherein
   the processing circuitry corrects the detection value of the amplitude level corresponding to the detected bit position to an amplitude level adjacent to the detection value so that the rule violation is resolved.

3. The signal processing device according to claim 2, wherein the multilevel signal has a signal waveform that is obtained by synchronously adding an encoded signal generated based on a specific bipolar coding rule and the clock.

4. The signal processing device according to claim 3, wherein
   the wired interface receives a multilevel signal having a signal waveform which has six amplitude levels (A3, A2, A1, −A1, −A2, −A3; |A3|>|A2|>|A1|) and which is obtained by synchronously adding an encoded signal generated based on an AMI coding rule and the clock, and
   the processing circuitry recognizes a change pattern of amplitude levels of consecutive two bits changing from A3 to −A1 or from A1 to −A3 among detected amplitude levels from the multilevel signal received by the wired interface, and detects the recognized bit position as a bit position at which the rule violation occurred.

5. The signal processing device according to claim 4, wherein the processing circuitry corrects, in case a change pattern of changing from A3 to −A1 is recognized, the detection value A3 of the amplitude level corresponding to the recognized bit position to A2 or corrects the detection value −A1 of the amplitude level to −A2, and corrects, in case a change pattern of changing from A1 to −A3 is recognized, the detection value A1 of the amplitude level corresponding to the recognized bit position to A2 or corrects the detection value −A3 of the amplitude level to −A2.

6. The signal processing device according to claim 1, wherein the processing circuitry:

decodes a bit sequence based on an amplitude level which has been corrected;

performs error detection by using the bit sequence that has been decoded;

decodes a bit sequence for each correction candidate, in case a plurality of correction candidates exist for the detection value of the amplitude level; and performs error detection for each decoding result to output a correct bit sequence.

7. An error correction method comprising the steps of:

receiving a multilevel signal having a signal waveform that is obtained by synchronously adding an encoded signal generated based on a specific coding rule and a clock which has an amplitude larger than the encoded signal and for which the transmission speed is half that of the encoded signal;

detecting an amplitude level of the multilevel signal received in the step of receiving a signal;

detecting a bit position at which rule violation of the specific coding rule occurred, based on a change pattern of the amplitude level detected in the step of detecting an amplitude level; and correcting a detection value of the amplitude level corresponding to the bit position detected in the step of detecting a violation so that the rule violation is resolved.

* * * * *